United States Patent
Li et al.

(10) Patent No.: US 12,289,676 B2
(45) Date of Patent: Apr. 29, 2025

(54) POWER SAVING SCHEMES IN WIRELESS COMMUNICATION

(71) Applicant: ZTE Corporation, Guangdong (CN)

(72) Inventors: Liguang Li, Guangdong (CN); Jun Xu, Guangdong (CN); Mengzhu Chen, Guangdong (CN); Xiaoying Ma, Guangdong (CN); Jin Xu, Guangdong (CN)

(73) Assignee: ZTE Corporation, Guangdong (CN)

( * ) Notice: Subject to any disclaimer, the term of this patent is extended or adjusted under 35 U.S.C. 154(b) by 37 days.

(21) Appl. No.: 17/245,292

(22) Filed: Apr. 30, 2021

(65) Prior Publication Data

US 2021/0289441 A1    Sep. 16, 2021

Related U.S. Application Data

(63) Continuation of application No. PCT/CN2018/113828, filed on Nov. 2, 2018.

(51) Int. Cl.
*H04W 52/02* (2009.01)

(52) U.S. Cl.
CPC ............ *H04W 52/0216* (2013.01); *H04W 52/0229* (2013.01)

(58) Field of Classification Search
CPC .......... H04W 52/0216; H04W 52/0229; Y02D 30/70
See application file for complete search history.

(56) References Cited

U.S. PATENT DOCUMENTS

| | | | |
|---|---|---|---|
| 9,578,601 B2 | 2/2017 | Ramkumar et al. | |
| 9,699,624 B1 | 7/2017 | Huang et al. | |
| 9,794,873 B2 | 10/2017 | Lindoff et al. | |
| 10,153,816 B2 | 12/2018 | Bangolae et al. | |
| 2010/0035555 A1 | 2/2010 | Bala et al. | |
| 2013/0201964 A1 | 8/2013 | Kim et al. | |
| 2017/0273061 A1 | 9/2017 | Park et al. | |
| 2017/0367046 A1 | 12/2017 | Papasakellariou | |
| 2018/0262316 A1 | 9/2018 | Wang et al. | |
| 2019/0313433 A1* | 10/2019 | Abedini ............ | H04W 72/0446 |

(Continued)

FOREIGN PATENT DOCUMENTS

| CN | 101730139 A | 6/2010 |
|---|---|---|
| CN | 104704786 A | 6/2015 |

(Continued)

OTHER PUBLICATIONS

3GPP TS 38.214 V15.3.0, Sep. 2018, 3rd Generation Partnership Project, Technical Specification Group Radio Access Network, NR, Physical layer procedures for data, Release 15, France, 96 pages.

(Continued)

*Primary Examiner* — Marcos L Torres
(74) *Attorney, Agent, or Firm* — Perkins Coie LLP

(57) ABSTRACT

Methods, systems, and devices for power saving schemes in a wireless communication are described. A wireless communication method is provided to include obtaining, by a network device, one or more parameters of a user device, determining, by the network device, whether the one or more parameters satisfy a predetermined condition, and configuring the user device in a power saving mode based on the one or more parameters.

14 Claims, 12 Drawing Sheets

(56) References Cited

U.S. PATENT DOCUMENTS

| | | | |
|---|---|---|---|
| 2020/0021420 A1 | | 1/2020 | Li et al. |
| 2021/0321446 A1* | | 10/2021 | Lee ..................... H04L 5/0094 |
| 2021/0392514 A1* | | 12/2021 | Matsumura ....... H04W 72/1263 |
| 2021/0400580 A1* | | 12/2021 | Maleki .............. H04W 52/0216 |

FOREIGN PATENT DOCUMENTS

| | | |
|---|---|---|
| CN | 105122672 A | 12/2015 |
| CN | 105745595 A | 7/2016 |
| CN | 107113727 A | 8/2017 |
| CN | 107872257 | 4/2018 |
| JP | 2013135247 A | 7/2013 |
| KR | 101750371 B1 | 7/2017 |
| WO | 2018-167958 | 9/2018 |
| WO | 2018/174692 | 9/2018 |
| WO | 2018/175805 | 9/2018 |
| WO | 2018/177223 | 10/2018 |

OTHER PUBLICATIONS

Co-Pending JP Application No. 2021-524010, Official Action dated Sep. 9, 2022, 4 pages with unofficial English summary.

Qualcomm Incorporated "Remaining issues for non-MIMO features and capabilities Discussion/Decision," 3GPP TSG RAN WG1 Meeting 94 Gothenburg, Sweden, Aug. 20-24, 2018, R1-1809905 7 pages.

Co-Pending EP Application No. 18930346.4, Extended Search Report dated May 20, 2022, 11 pages.

Qualcomm Incorporated "Remaining Issues on DL/UL Resource Allocation," 3GPP TSG-RAN WG1 Meeting #93 May 21-25, 2018, Busan, Korea, R1-1807652, 16 pages.

International Search Report and Written Opinion in International Application No. PCT/CN2018/113828, mailed Aug. 7, 2019, 6 pages.

Co-Pending JP Application No. 2021-524010, Notice of Allowance dated Feb. 2, 2023, 3 pages.

Co-Pending CN Application No. 202210060473.5, Official Action dated Aug. 2, 2023, 11 pages with unofficial English translation.

CNIPA, Notification to Complete Formalities of Registration for Chinese Application No. 202210060473.5, mailed on Dec. 15, 2023, 7 pages with unofficial translation.

Co-Pending EP Application No. 18930346.4, Communication under Rule 71(3) EPC dated Feb. 1, 2024, 8 pages.

Office Action for Korean Application No. 10-2021-7016748, mailed on May 7, 2024, 12 pages with machine translation.

Co-Pending EP Application No. 24185367.0, Extended Search Report dated Oct. 9, 2024, 12 pages.

3GPP, "Technical Specification Group Radio Access Network; Evolved Universal Terrestrial Radio Access (E-UTRA); Multiplexing and channel coding" (Release 15), 3GPP TS 36.212 V15.3.0 (Sep. 2018); 247 Pages.

Ericsson "On beam indication, measurement, and reporting" 3GPP TSG-RAN WG1 #90bis R1-1718433 Prague, Czech Republic, Oct. 9-13, 2017, 9 pages.

Qualcomm Incorporated "Maintenance for CSI Measurement" 3GPP TSG RAN WG1 Meeting #92bis R1-1805521, Apr. 16-20, 2018, Sanya, China, 11 pages.

Samsung "Corrections on CA operation" 3GPP TSG RAN WG1 Meeting #93 R1-1806740, Busan, Korea, May 21-25, 2018, 5 pages.

Notice of Allowance for Korean Application No. 10-2021-7016748, dated Jan. 9, 2025, with machine English translation, 10 pages.

* cited by examiner

POWER SAVING SCHEMES IN WIRELESS COMMUNICATION

CROSS-REFERENCE TO RELATED APPLICATIONS

This application is a continuation of International Patent Application No. PCT/CN2018/113828, filed on Nov. 2, 2018, the contents of which are incorporated herein by reference in their entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, thereby requiring robust interference mitigation when using multiple access protocols.

SUMMARY

This document relates to methods, systems, and devices for power saving schemes in wireless communication. The disclosed technology describes methods that can be implemented at a plurality of network-side devices (such as a base station) to prevent or reduce unnecessary power consumptions of a user device.

In one aspect, a wireless communication method is provided to include: obtaining, by a network device, one or more parameters of a user device; determining, by the network device, whether the one or more parameters satisfy a predetermined condition; and configuring the user device in a power saving mode based on the one or more parameters.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

The above and other aspects and their implementations are described in greater detail in the drawings, the descriptions, and the claims.

DETAILED DESCRIPTION

The disclosed technology provides implementations and examples of power saving schemes in a wireless communication. Some implementations of the disclosed technology provide techniques to prevent or reduce unnecessary power consumptions of a user equipment (UE) by allowing a UE to be in a power saving mode.

In NR (New Radio), the power consumption of the UE may be very high due to the increased level of computational complexity of implementation and also due to the amount of data that the UE may be producing or consuming. Since the UE directly relates to the user's experience, the large power consumption of the UE results in undesired user experience. In the existing communication system, configuration parameters of UE are generally configured by a network-side device, for example, a base station. The parameters configured by the network-side device may not quickly adapt to the instant traffic changes. In case that the configuration parameters are not updated or reconfigured based on the traffic, it is possible that the parameters may configure the UE to have an adverse effect of unnecessarily increasing power consumption.

Figure 1:
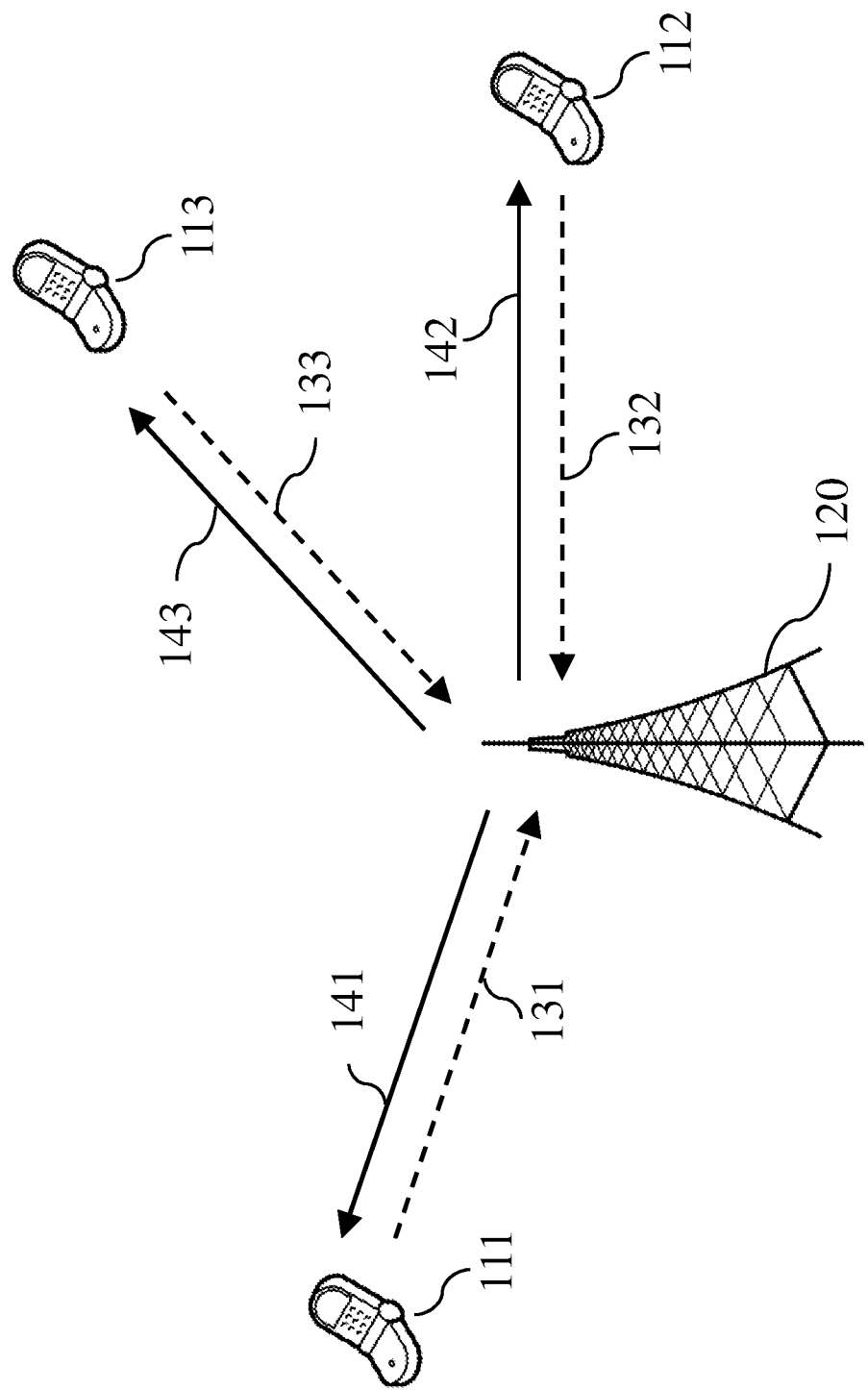
FIG. 1 shows an example of a base station (BS) and user equipment (UE) in wireless communication based on some implementations of the disclosed technology.

FIG. 1 shows an example of a wireless communication system (e.g., a 5G or NR cellular network) that includes a BS 120 and one or more user equipment (UE) 111, 112 and 113. In some embodiments, the UEs access the BS (e.g., the network) using implementations of the disclosed technology (131, 132, 133), which then enables subsequent communication (141, 142, 143) from the BS to the UEs. The UE may be, for example, a smartphone, a tablet, a mobile computer, a machine to machine (M2M) device, an Internet of Things (IoT) device, and so on.

Figure 2:
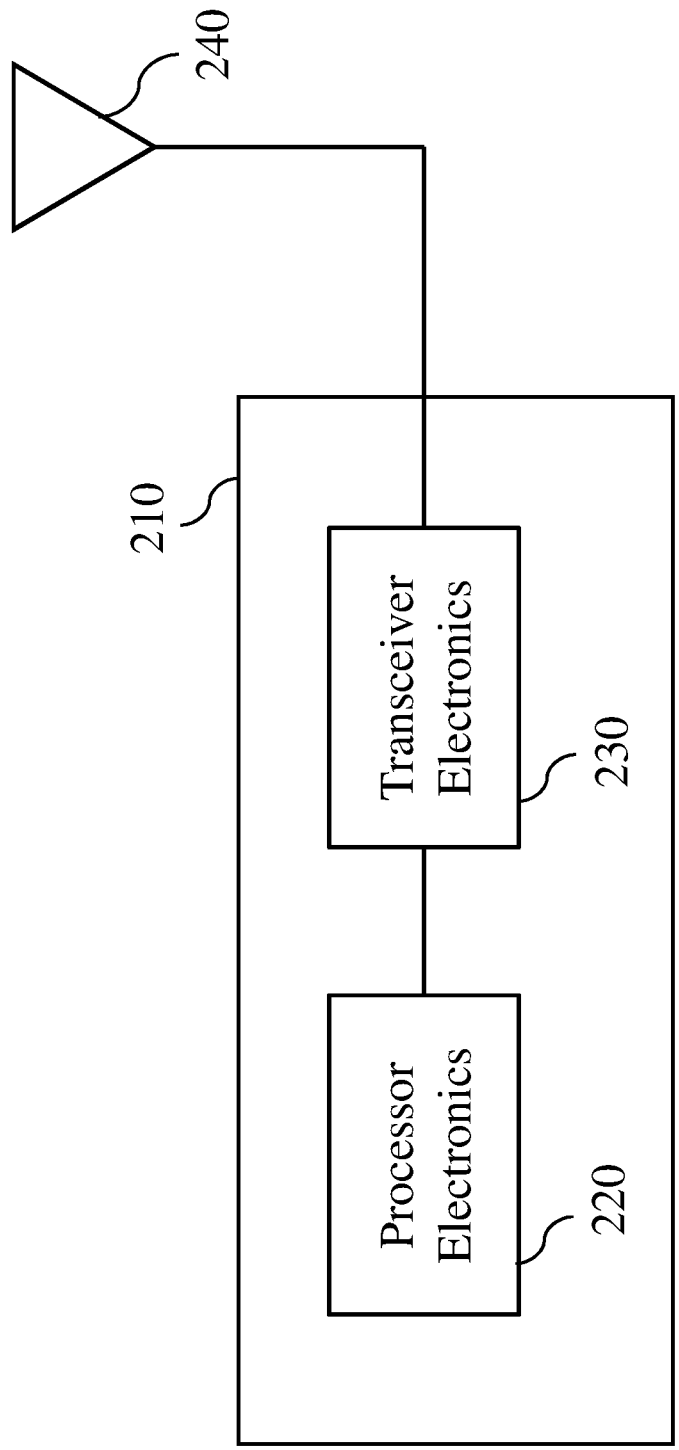
FIG. 2 shows an example of a block diagram of a portion of an apparatus based on some implementations of the disclosed technology.

FIG. 2 shows an example of a block diagram representation of a portion of an apparatus. An apparatus 210 such as a base station or a wireless device (or UE) can include processor electronics 220 such as a microprocessor that implements one or more of the techniques presented in this document. The apparatus 210 can include transceiver electronics 230 to send and/or receive wireless signals over one or more communication interfaces such as antenna 240. The apparatus 210 can include other communication interfaces for transmitting and receiving data. The apparatus 210 can include one or more memories (not explicitly shown) configured to store information such as data and/or instructions. In some implementations, the processor electronics 220 can include at least a portion of transceiver electronics 230. In some embodiments, at least some of the disclosed techniques, modules or functions are implemented using the apparatus 210.

Figure 3:
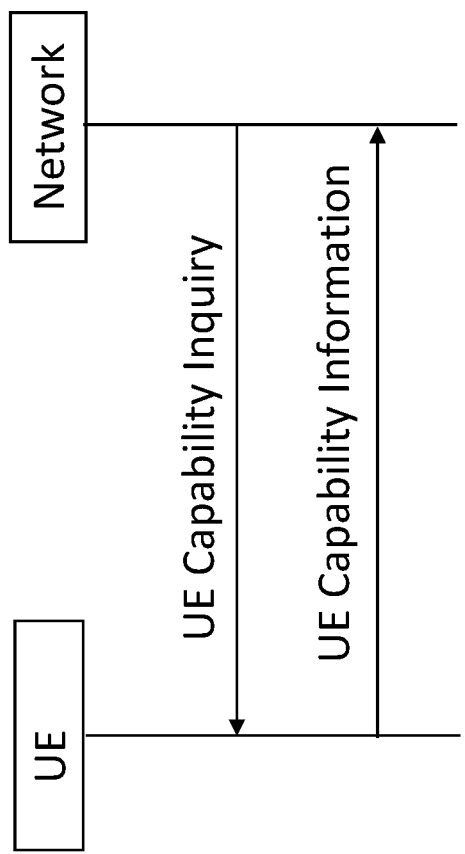
FIG. 3 shows a conventional process for configurating parameters of a user device.

FIG. 3 shows a conventional process for configurating parameters of a user device. The configured parameters may include parameters such as time, frequency, spatial domain, and so on. As shown in FIG. 3, in the existing communication system, the network-side device first sends a UE capability inquiry to UE. After the reception of UE capability inquiry from the network-side device, the UE would report its capability information ("UE capability information"). The maximum ability of parameter configuration supported by the UE is included in the UE capability information which includes time domain processing capability, frequency domain processing capability and MIMO processing capability. After receiving the UE capability information, the network configures the UE with configuration parameters based on scheduling strategies and channel state information. The configuration parameters, however, may cause unnecessary power consumption by remaining the same without the reconfiguration. For example, the parameters configured in URLLC (Ultra-Reliable Low Latency) may cause unnecessary power consumption when used in eMBB (Enhanced Mobile Broadband). Therefore, the disclosed technology provides power saving schemes to prevent or reduce the unnecessary power consumption and achieve the UE power saving. According to some implementations of the disclosed technology, the UE can adapt to different traffics to save its power consumption.

The techniques or methods disclosed in this patent document for processing the UE power saving can be applied to a new radio access technology (NR) communication system, an LTE mobile communication system, a fifth generation (5G) mobile communication system, or other wireless/wired communication system. The techniques or methods can be performed at a network-side device such as the base station. In some implementations, the base station may include at least one of an access point (AP), a Node B, a radio network controller (RNC), an evolved Node B (eNB or gNB), a base station controller (BSC), a Base Transceiver Station (BTS), a Base Station (BS), a Transceiver Function (TF), a Radio Router, a Radio Transceiver, a Basic Service Unit, an Extended Service Unit, a radio base station (RBS), or some other terminology.

Figure 4:
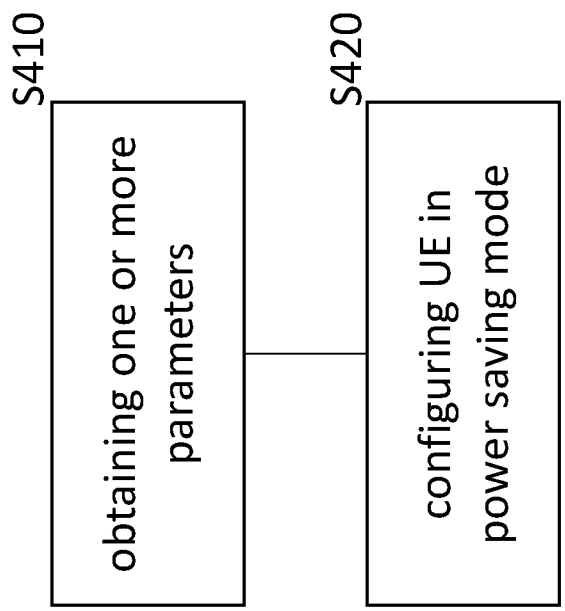
FIG. 4 shows an example of a power saving scheme based on some implementations of the disclosed technology.

FIG. 4 shows an example of a power saving scheme based on the disclosed technology. As shown in FIG. 4, the power saving scheme proceeds to configure the UE in the power saving mode based on one or more parameters. At 410, one or more parameters are obtained. In some implementations, the one or more parameters may comprise at least one of following parameters: scrambling method configured for PDCCH (Physical Downlink Control Channel), actual scrambling method of PDCCH, DCI (Downlink Control Information) format, control resource set, search space, PDCCH candidates, aggregation level, subcarrier spacing, frequency range, CSI (channel state information) report configuration, PDSCH (Physical Downlink Shared Channel) configuration, PUSCH (Physical Uplink Shared Channel) configuration, semi persistent scheduling configuration, or uplink OFDM (Orthogonal Frequency Division Multiplexing) waveform. The scrambling method of PDCCH can be chanced during the operation due to various reasons and thus the actual scrambling method of PDCCH can be different from the scrambling method configured for PDCCH. The below is more information included in each of the parameters obtained at 410.

The scrambling method configured for PDCCH may comprise at least one of following parameters: C-RNTI (Cell Radio Network Temporary Identifier), MCS-C-RNTI (Modulation and coding scheme C-RNTI), TC-RNTI (temporary C-RNTI), SP-CSI-RNTI (Semi-Persistent Channel State Information RNTI), CS-RNTI (Configured Scheduling RNTI), RA-RNTI (Random access-RNTI).

The actual scrambling method of PDCCH may comprise at least one of following parameters: C-RNTI, MCS-C-RNTI, TC-RNTI, SP-CSI-RNTI, CS-RNTI, RA-RNTI.

The DCI format may comprise at least one of following parameters: DCI format 0_0, DCI format 0_1, DCI format 1_0, DCI format 1_1, DCI format 2_0, DCI format 2_1, DCI format 2_2, DCI format 2_3. DCI format 0_0 is used for the scheduling of PUSCH in one cell. DCI format 0_0 includes following items: Identifier for DCI formats, Frequency domain resource assignment, Time domain resource assignment, Frequency Hopping Flag, Modulation and coding scheme, New data indicator, Redundancy version, HARQ process number, TPC command for scheduled PUSCH, and UL/SUL indicator. DCI format 0_1 is used for the scheduling of PUSCH in one cell. DCI format 0_1 is also used for the scheduling of PUSCH in one cell and it has more items than DCI format 0_0. DCI format 1_0 is applied for scheduling of PDSCH in one cell and it can be scrambled by C-RNTI, RA-RNTI, TC-RNTI, SI-RNTI or P-RNTI. DCI format 1_1 is also used for the scheduling of PDSCH in one cell and it has more items than DCI format 1_0. DCI format 2_0 is used for notifying a group of UEs of the slot format. DCI format 2_1 is used for notifying a group of UEs of the PRB(s) and OFDM symbol(s) where UE may assume no transmission is intended for the UE. Format 2_2 is used for transmission of TPC commands for PUCCH and PUSCH. Format 2_3 is used for transmission of a group of TPC commands for SRS transmissions by one or more UEs.

The control resource set may comprise at least one of following parameters: frequency domain resource, duration, PDCCH DMRS (demodulation reference signal) scrambling ID, precoder granularity.

The search space may comprise at least one of following parameters: search space type, PDCCH monitoring slot periodicity, PDCCH monitoring slot duration.

The PDCCH candidates may comprise at least one of following parameters: number of candidates for aggregation level 1, number of candidates for aggregation level 2, number of candidates for aggregation level 4, number of candidates for aggregation level 8, number of candidates for aggregation level 16.

The aggregation level may comprise one of following parameters: 1, 2, 4, 8, 16.

The subcarrier spacing may comprise one of following parameters: 15 kHz, 30 kHz, 60 kHz, 120 kHz, 240 kHz, 480 kHz.

The frequency range may comprise one of following parameters: FR1 (frequency range 1) and FR2 (frequency range 2).

The CSI report configuration may comprise one of following parameters: CQI (Channel quality indicator) table, report configuration type, CQI format indicator, PMI (Precoding matrix indicator) format indicator, CSI report periodicity and offset.

The PDSCH configuration may comprise one of following parameters: MCS (Modulation and coding scheme) table of PDSCH, start symbol and length of PDSCH, PDSCH aggregation factor.

The PUSCH configuration may comprise one of following parameters: MCS table of PUSCH, start symbol and length of PUSCH, PUSCH aggregation factor.

The semi persistent scheduling configuration may comprise at least one of following parameters: MCS table, periodicity.

The uplink OFDM waveform configuration may comprise: cyclic prefix OFDM, transform precoding OFDM.

At 420, configuring the UE in the power saving mode is performed. In the disclosed technology, the configuring the UE in the power saving mode can be implemented various ways which include at least one of the following: enhanced time domain processing for power saving, enhanced DRX (Discontinuous Reception) processing for power saving, enhanced BWP (Bandwidth Part) processing for power saving, enhanced CA (Carrier Aggregation) processing for power saving, enhanced MIMO (Multiple Input Multiple Output) processing for power saving, enhanced PDCCH monitoring for power saving.

Examples of Enhanced Time Domain Processing for Power Saving

The enhanced time domain processing for power saving comprises one of following: cross slot scheduling for PDSCH, multi-slot scheduling, slot aggregation scheduling, cross slot scheduling for HARQ-ACK (Hybrid automatic repeat request acknowledgement), cross slot scheduling for PUSCH.

Cross-Slot Scheduling for PDSCH

Figure 5:
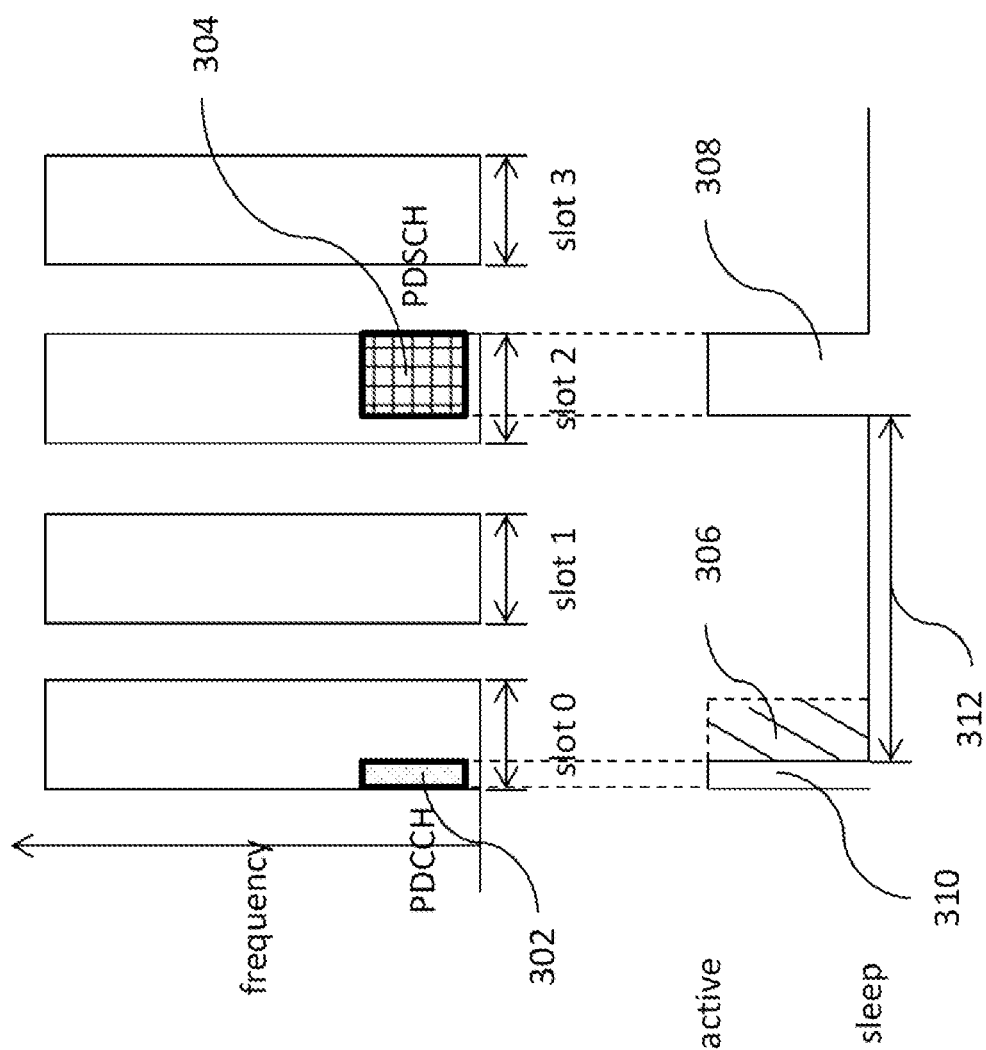
FIG. 5 shows an example of a cross slot scheduling for PDSCH based on an implementation of the disclosed technology.

FIG. 5 shows an example of a cross slot scheduling for PDSCH. The signal in PDCCH (Physical Downlink Control Channel) 302 is monitored or decoded (blind-decoded) to obtain DCI. The DCI indicates the position of PDSCH 304. If the gap (specified in slots) between the position of PDCCH and the position of PDSCH is greater than 0, it is referred to as 'cross-slot scheduling'. The example of the cross-slot scheduling is shown in FIG. 5 with the gap equal to 2 slots. The UE has 2 states: sleep state (power saving, such as micro sleep, light sleep or deep sleep) and active state (high power for signal receiving/processing). Slots with PDCCH monitoring only (without any scheduling grant and PDSCH/PUSCH/PUCCH) takes a significant portion of time and energy. The occasion when the UE monitors the PDCCH only without any scheduling grant and PDSCH/PUSCH/PUCCH will be referred to as PDCCH monitoring only case for the ease of reference. If the UE is unaware of the cross-slot scheduling of PDSCH in advance, it needs to receive the remaining OFDM symbols corresponding to PDCCH decoding time (as 306 in FIG. 5) and it will lead to unnecessary power consumption. RF (Radio Frequency) dominates the overall power consumption in the PDCCH monitoring only case. The sleep state (micro sleep) is regarded as the most efficient power saving scheme in the PDCCH monitoring only case. During the micro sleep, RF components is turned off, when no grant is detected within a slot. If the UE knows the cross scheduling for PDSCH in advance, it can go into sleep (such as micro sleep) as soon as possible after receiving the last OFDM symbol of PDCCH and the power consumption can be reduced, as 312 in FIG. 5. In FIG. 5, the UE receives the DCI at 310 and PDSCH at 308. If the gap (specified in slots) between the position of PDCCH and the position of PDSCH is equal to 0, it is referred to as 'same slot scheduling'.

A more specific example is described follow. The IE (Information Element) 'PDSCH-TimeDomainResourceAllocation' is used to configure a time domain relation between PDCCH and PDSCH. The time domain relation between PDCCH and PDSCH is defined as slot offset 'k0', where k0>0 for cross slot scheduling and k0=0 for same slot scheduling. The 'PDSCH-TimeDomainResourceAllocationList' contains one or more of such PDSCH-TimeDomainResourceAllocations. The network indicates in the DL (Downlink) assignment which of the configured time domain allocations the UE shall apply for that DL assignment. Value 0 in the DCI field refers to the first element in this list, value 1 in the DCI field refers to the second element in this list, and so on. An example for the cross-slot scheduling for power saving, all the values of k0 in 'PDSCH-TimeDomainResourceAllocationList' are greater than 0. Another example for the cross-slot scheduling for power saving, the non-zero values of k0 in 'PDSCH-TimeDomainResourceAllocationList' are configured.

Multi-Slot Scheduling

Figure 6:
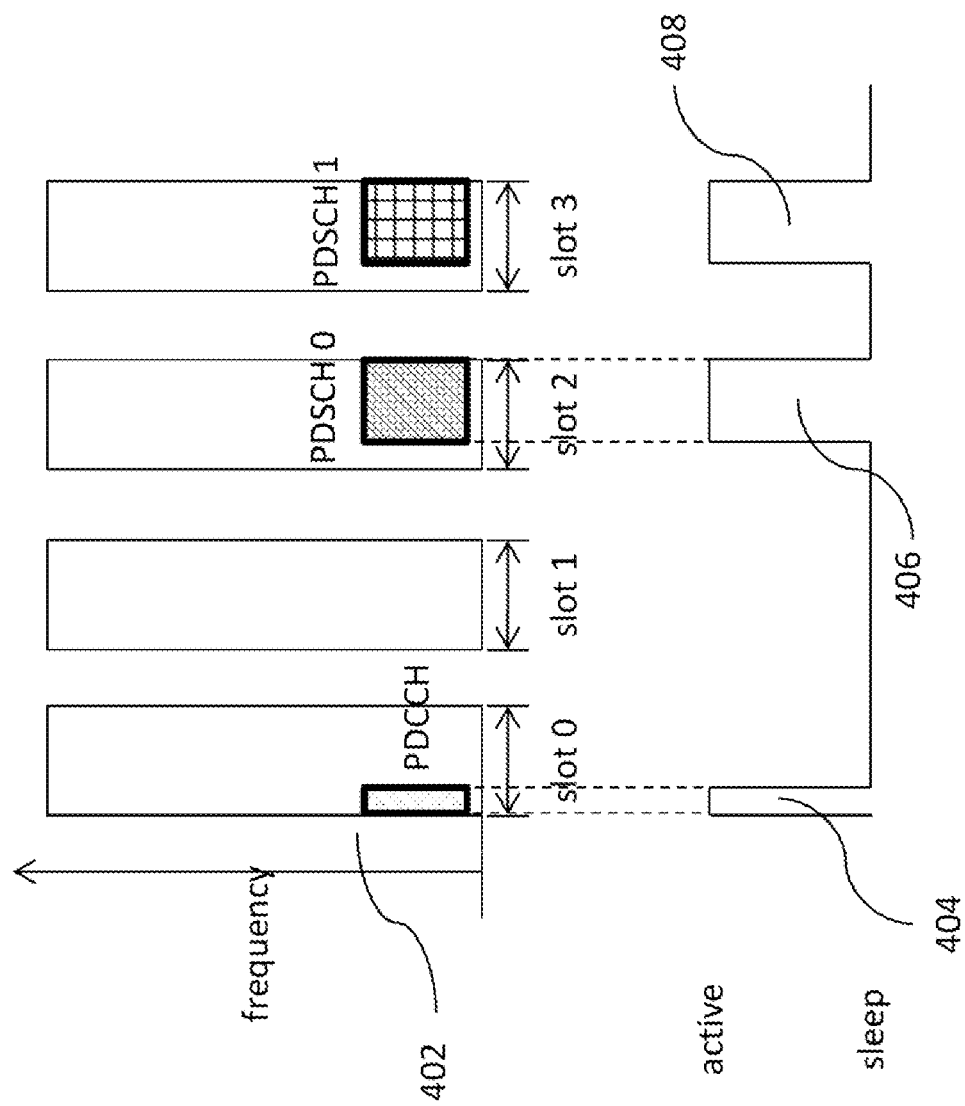
FIG. 6 shows an example of a multi slot scheduling based on an implementation of the disclosed technology.

FIG. 6 shows an example for multi-slot scheduling. The UE would spend greater amount of power in processing large amount of data. The processing of large data could be done by not only the wider bandwidth but also longer duration. The large data packet might need to be segmented and served by multiple slots. If multi-slot data packets were scheduled to receive the large data pack in separately distributed slots, the UE would spend the unnecessary power on PDCCH decoding and other signal processes during the non-received slot. From UE power saving perspective, it would be better for the UE to receive and/or transmit the data in consecutive slots to finish all data reception/transmission in one shot including all HARQ (Hybrid automatic repeat request) feedback. The solution for the UE power saving is to support multi-slot scheduling, which the DCI contains resource allocations and other scheduling information for more than one slot in order for the UE to complete the reception and/or transmission in shortest time and minimize the power consumption. As shown in FIG. 6, the UE needs to wake up to receive DCI in PDCCH 402 at 404. The DCI indicates the scheduling information for PDSCH 0 406 and PDSCH 1 408. Generally, each PDSCH is scheduled by one DCI. UE only needs to wake up 3 times: monitoring PDCCH at slot 0, receiving PDSCH 0 at slot 2 and PDSCH 1 at slot 3. Therefore, UE just decodes one PDCCH and its power consumption can be reduced. The multi-slot scheduling can also be configured for PUSCH as well as PDSCH.

Slot Aggregation Scheduling

Figure 7:
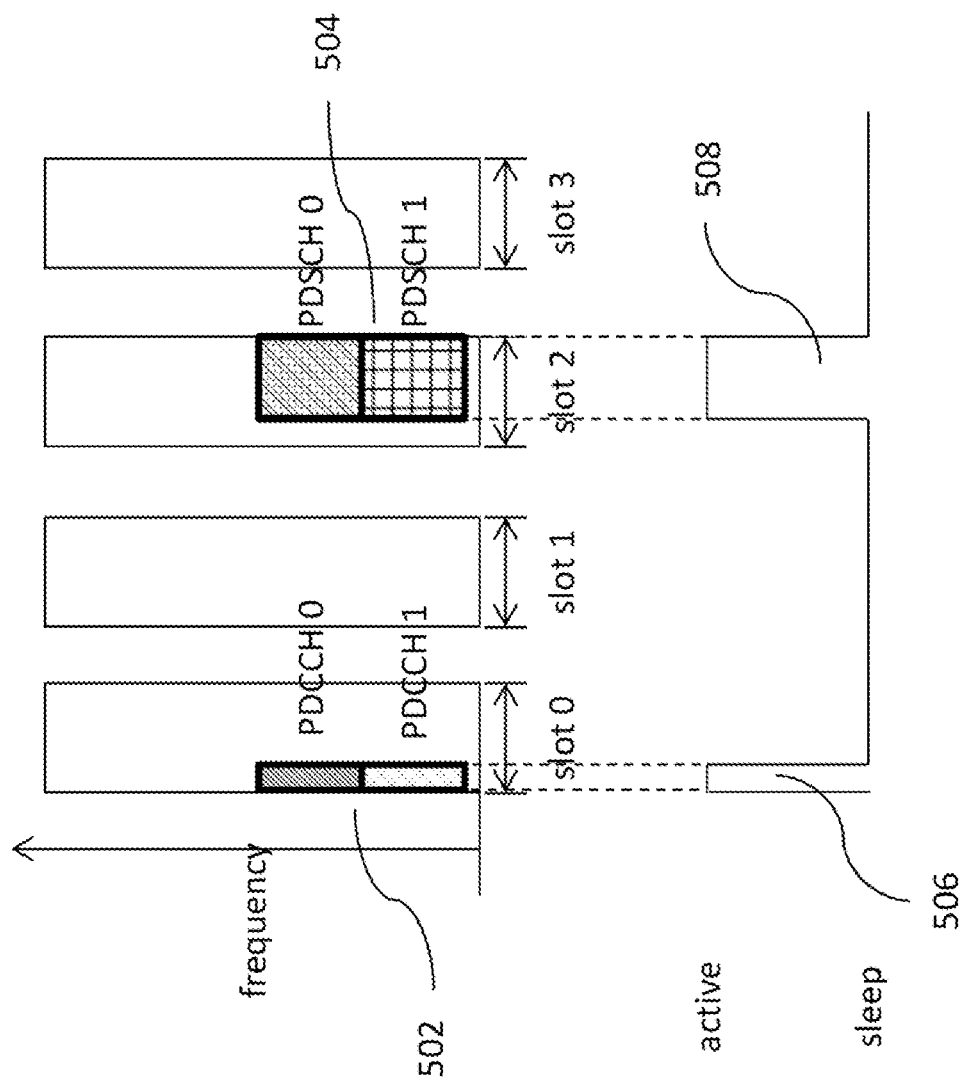
FIG. 7 shows an example of a slot aggregation scheduling based on an implementation of the disclosed technology.

FIG. 7 shows an example for slot aggregation scheduling. Two different data packets corresponding to PDSCH 0 and PDSCH 1 are transmitted to the UE. Each data packet (PDSCH) is scheduled by the DCI. For slot aggregation scheduling, the two DCIs are transmitted in the same slot 502 in FIG. 7, and the two PDSCHs are also allocated at the same slot 504 in FIG. 7. The UE wakes up to decode the two DCIs in the slot 0 at 506 and receives PDSCH in the slot 2 at 508. The UE only needs to wake up twice: monitoring PDCCH at slot 0, receiving PDSCH at slot 2. Therefore, the UE power consumption can be reduced for decrease of wake up. The slot aggregation scheduling can also be configured for PUSCH as well as PDSCH.

For power saving of cross slot scheduling for HARQ-ACK is described as follow. The UE needs to return a HARQ-ACK to the base station after a PDSCH is received. If the UE detects a DCI format 1_0 or a DCI format 1_1 scheduling a PDSCH reception ending in slot n or if the UE detects a DCI format 1_0 indicating a SPS PDSCH release through a PDCCH reception ending in slot n, the UE provides corresponding HARQ-ACK information in a PUCCH transmission within slot n+k, where k is a number of slots and is indicated by the PDSCH-to-HARQ-timing-indicator field in the DCI format (cross slot scheduling for HARQ-ACK is configured when k>0). k may be named as slot offset kl. It is provided by higher layer parameter dl-DataToUL-ACK. If the PDSCH subcarrier spacing is equal to or greater than the PUCCH subcarrier spacing or, in case of SPS PDSCH release if the PDCCH subcarrier spacing is equal to or greater than the PUCCH subcarrier spacing, k=0 corresponds to the slot of the PUCCH transmission that overlaps with the slot of the PDSCH reception or of the PDCCH reception in case of SPS PDSCH release. If the PDSCH subcarrier spacing is smaller than the PUCCH subcarrier spacing or, in case of SPS PDSCH release if the PDCCH subcarrier spacing is smaller than the PUCCH subcarrier spacing, k=0 corresponds to the slot of the PUCCH transmission that ends at a same time as the slot of the PDSCH reception or of the PDCCH reception in case of SPS PDSCH release.

For DCI format 1_0, the PDSCH-to-HARQ-timing-indicator field values map to {1, 2, 3, 4, 5, 6, 7, 8}. For DCI format 1_1, the PDSCH-to-HARQ-timing-indicator field values map to values for a set of number of slots provided by higher layer parameter dl-DataToUL-ACK of 'PUCCH-Config' as defined in Table 1. The dl-DataToUL-ACK contains at least one or maximum 8 values from the set {0, 1, 2, 3, 4, . . . , 15}.

TABLE 1

Mapping of PDSCH-to-HARQ_feedback timing indicator field values to numbers of slots

| PDSCH-to-HARQ_feedback timing indicator | | | |
|---|---|---|---|
| 1 bit | 2 bits | 3 bits | Number of slots $k$ |
| '0' | '00' | '000' | $1^{st}$ value provided by dl-DataToUL-ACK |
| '1' | '01' | '001' | $2^{nd}$ value provided by dl-DataToUL-ACK |
|  | '10' | '010' | $3^{rd}$ value provided by dl-DataToUL-ACK |
|  | '11' | '011' | $4^{th}$ value provided by dl-DataToUL-ACK |
|  |  | '100' | $5^{th}$ value provided by dl-DataToUL-ACK |
|  |  | '101' | $6^{th}$ value provided by dl-DataToUL-ACK |
|  |  | '110' | $7^{th}$ value provided by dl-DataToUL-ACK |
|  |  | '111' | $8^{th}$ value provided by dl-DataToUL-ACK |

For power saving of cross slot scheduling for HARQ-ACK, all the values in dl-DataToUL-ACK are larger than 0. An example for cross slot scheduling for HARQ-ACK, dl-DataToUL-ACK is equal to {2,4,6,8}.

For power saving of cross slot scheduling for PUSCH is described as follow. When the UE is scheduled to transmit a transport block and no CSI report, or the UE is scheduled to transmit a transport block and a CSI report(s) on PUSCH by a DCI, the Time domain resource assignment field value m of the DCI provides a row index m+1 to an allocated table 2. The value of j is defined in Table 3, where $\mu_{PUSCH}$ is the subcarrier spacing configurations for PUSCH. The indexed row defines the slot offset $K_2$, the start symbol S and the allocation length L, and the PUSCH mapping type to be applied in the PUSCH transmission.

For power saving of cross slot scheduling for PUSCH, the value of $K_2$ is configured larger than 1. An example for cross slot scheduling for PUSCH, the Time domain resource assignment field value m of the DCI is configured as one of {7, 8, 9, 10, 11, 12, 14, 15}.

TABLE 2

Default PUSCH time domain resource allocation A for normal CP

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 3

Definition of value j

| $\mu_{PUSCH}$ | j |
|---|---|
| 0 | 1 |
| 1 | 1 |
| 2 | 2 |
| 3 | 3 |

Or, when the UE is scheduled to transmit a PUSCH with no transport block and with a CSI report(s) by a CSI request field on a DCI, the Time-domain resource assignment field value m of the DCI provides a row index m+1 to an allocated table which is defined by the higher layer configured 'pusch-TimeDomainAllocationList' in 'pusch-Config'. The IE 'PUSCH-TimeDomainResourceAllocation' is used to configure a time domain relation between PDCCH and PUSCH. The IE PUSCH-TimeDomainResourceAllocationList' contains one or more of such PUSCH-TimeDomainResourceAllocations. The network indicates in the UL grant which of the configured time domain allocations the UE shall apply for that UL grant. The UE determines the bit width of the DCI field based on the number of entries in the PUSCH-TimeDomainResourceAllocationList'. Value 0 in the DCI field refers to the first element in this list, value 1 in the DCI field refers to the second element in this list, and so on. The indexed row defines the start and length indicator SLIV, and the PUSCH mapping type to be applied in the PUSCH transmission and the slot offset $K_2$ value is determined as $K_2 = \max_j Y_j(m+1)$, where $Y_j$, j=0, . . . , $N_{Rep}-1$ are the corresponding list entries of the higher layer parameter reportSlotOffsetList in CSI-ReportConfig for the $N_{Rep}$ triggered CSI Reporting Settings and $Y_j(m+1)$ is the (m+1)th entry of $Y_j$. The slot where the UE shall transmit the PUSCH is determined by $K_2$ as $$\left\lfloor n \cdot \frac{2^{\mu_{PUSCH}}}{2^{\mu_{PDCCH}}} \right\rfloor + K_2$$

where n is the slot with the scheduling DCI, $K_2$ is based on the numerology of PUSCH, and $\mu_{PUSCH}$ and $\mu_{PDCCH}$ are the subcarrier spacing configurations for PUSCH and PDCCH, respectively.

The starting symbol S relative to the start of the slot, and the number of consecutive symbols L counting from the symbol S allocated for the PUSCH are determined from the start and length indicator SLIV of the indexed row:

if $(L-1) \leq 7$ then $$SLIV = 14 \cdot (L-1) + S$$

else $$SLIV = 14 \cdot (14-L+1) + (14-1-S)$$

where $0 < L \leq 14-S$, and

The UE shall consider the S and L combinations defined in Table 4 as valid PUSCH allocations

TABLE 4

| PUSCH mapping | Valid S and L combinations | | | | | |
|---|---|---|---|---|---|---|
| | Normal cyclic prefix | | | Extended cyclic prefix | | |
| type | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 12} | {1, ..., 12} | {1, ..., 12} |

For power saving of cross slot scheduling for PUSCH, all the values of $K_2$ are larger than 1. An example for cross slot scheduling for PUSCH, all the values of $K_2$ in 'PUSCH-TimeDomainResourceAllocationList' are configured as {3,5,7,8,9,10,12,15}.

Enhanced DRX Processing for Power Saving

The enhanced DRX processing for power saving comprises one of following: reduction of DRX 'on duration' timer, reduction of DRX inactivity timer, reduction of DRX re-transmission timer, increase of DRX short cycle, increase of DRX long cycle, reduction of DRX short cycle timer.

Reduction of DRX 'on Duration' Timer

Figure 8:
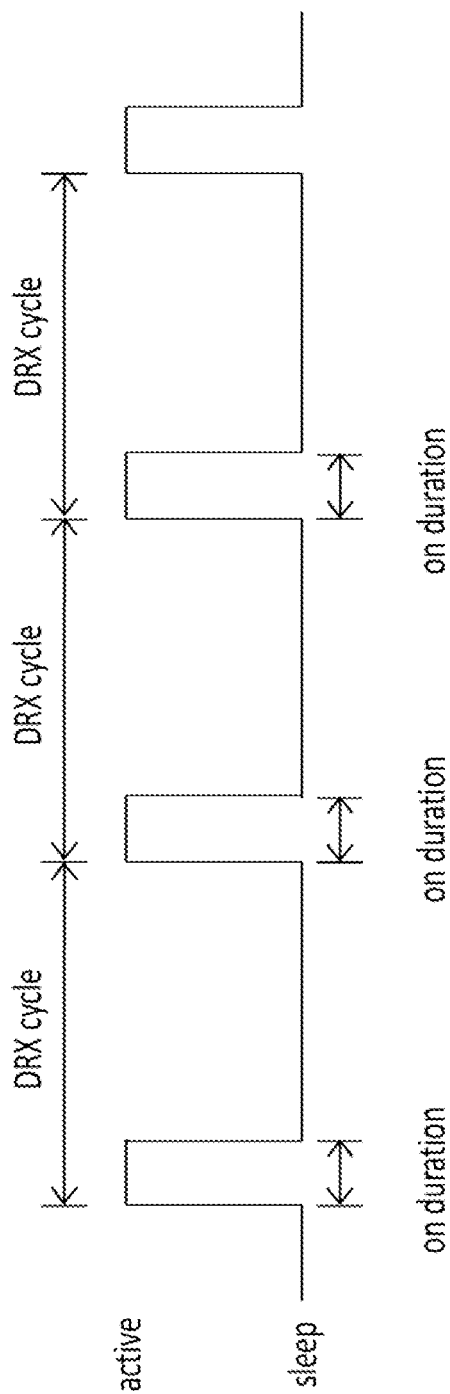
FIGS. 8-10 show examples of DRX processing based on some implementations of the disclosed technology.

FIG. 8 shows an example of DRX processing. In each DRX cycle, 'on duration' period and inactivity period are configured. During the 'on duration' period, the UE monitors the PDCCH in the configured search space sets to check if a UL/DL (Uplink/Downlink) scheduling is granted. Minimizing 'on duration' facilitates the power saving and thus, some implementations of the disclosed technology suggest configuring the UE with a relatively short 'on duration' (reduction of DRX on duration timer), as far as the latency requirement allows. An example for reducing the DRX 'on duration' timer is described as follows. The IE 'DRX-Config' is used to configure DRX related parameters and it includes at least parameter of 'drx-onDurationTimer'. Value for 'drx-onDurationTimer' is specified in multiples of 1/32 ms (subMilliSeconds) or in ms (milliSecond). For the latter, ms1 corresponds to 1 ms, ms2 corresponds to 2 ms, and so on. The value of 'drx-onDurationTimer' can be set as one of milliseconds set of {ms1, ms2, ms3, ms4, ms5, ms6, ms8, ms10, ms20, ms30, ms40, ms50, ms60, ms80, ms100, ms200, ms300, ms400, ms500, ms600, ms800, ms1000, ms1200, ms1600} or one of sub-milliseconds set of {1 ... 32}. An example for power saving mode is that the value for 'drx-onDurationTimer' is less than T0 ms, wherein T0 is equal to 1, 2, 4, 6, or 8. For different frequency ranges, the values of T0 are different, such T0 is 2 or 4 for FR1 (carrier frequency is less than 6 GHz or sub-6 GHz) and T0 is 0.5 or 1 for FR2 (carrier frequency is larger than 6 GHz).

Reduction of DRX Inactivity Timer

Figure 9:
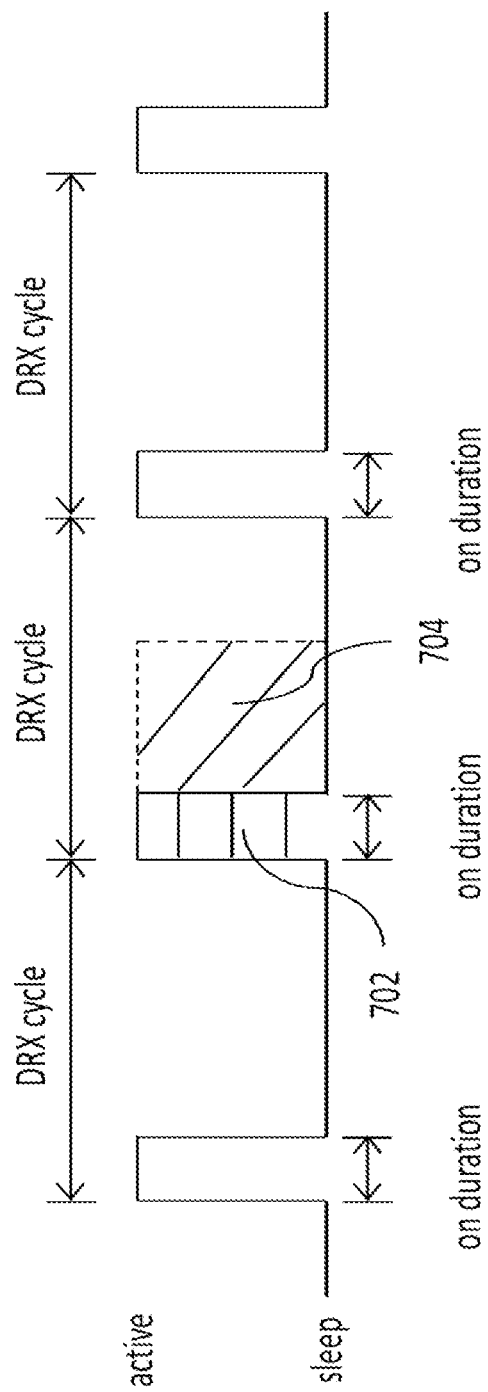

FIG. 9 shows an example of DRX processing. As shown in FIG. 9, when there is DCI detected to schedule new data during the 'on duration' period 702, an 'inactivity timer' 704 will be triggered. The UE keeps monitoring the PDCCH until the 'inactivity timer' expires and the 'inactivity timer' shall be restarted when there is new data scheduled. During the 'on duration' period and before the 'inactivity timer' expires, the UE is in active time. When the 'inactivity timer' expires, the UE is no longer in active time, and in this case the UE can go into sleep mode for power saving. Reduction of DRX inactivity timer can cut down the UE active time, which results in low power consumption. An example for reducing DRX inactivity timer is described as follow. The IE 'DRX-Config' is used to configure DRX related parameters and it includes at least parameter of 'drx-InactivityTimer'.

Value of 'drx-InactivityTimer' is specified in multiple integers of 1 ms. ms0 corresponds to 0, ms1 corresponds to 1 ms, ms2 corresponds to 2 ms, and so on. The value of 'drx-InactivityTimer' can be set as one of {ms0, ms1, ms2, ms3, ms4, ms5, ms6, ms8, ms10, ms20, ms30, ms40, ms50, ms60, ms80, ms100, ms200, ms300, ms500, ms750, ms1280, ms1920, ms2560}. An example for power saving mode is that the value for 'drx-InactivityTimer' is less than T1 ms, wherein T1 is equal to 1, 2, 4, 6, or 8.

Reduction of DRX Re-Transmission Timer

Another parameter in IE 'DRX-Config' is re-transmission timer. If downlink asynchronous HARQ is configured for the UE, the UE is impossible to wait long time to receive the re-transmission data. UE will go to sleep when the DRX re-transmission timer expires. The UE still attends to receive HARQ transmission until DRX re-transmission timer expires. Therefore, a smaller DRX re-transmission timer is beneficial for power saving. The IE 'DRX-Config' is used to configure DRX related parameters and it includes at least parameter of 'drx-RetransmissionTimerDL'. Value of 'drx-RetransmissionTimerDL' is specified in number of slot lengths of where the transport block was transmitted. The value of 'drx-RetransmissionTimerDL' can be set as one of {s10, s11, s12, s14, s16, s18, s116, s124, s133, s140, s164, s180, s196, s1112, s1128, s1160, s1320}. S10 corresponds to 0 slots, s11 corresponds to 1 slot, s12 corresponds to 2 slots, and so on. For uplink HARQ, the parameter of 'drx-RetransmissionTimerUL' is similar as 'drx-RetransmissionTimerDL' and they have the same values. An example for power saving mode is that the value for 'drx-RetransmissionTimerDL' or 'drx-RetransmissionTimerUL' is less than T2 slots, wherein T2 is equal to 1, 2, 4, 6, or 8.

Increase of DRX Short and Long Cycles or Reduction of DRX Short Cycle Timer

Figure 10:
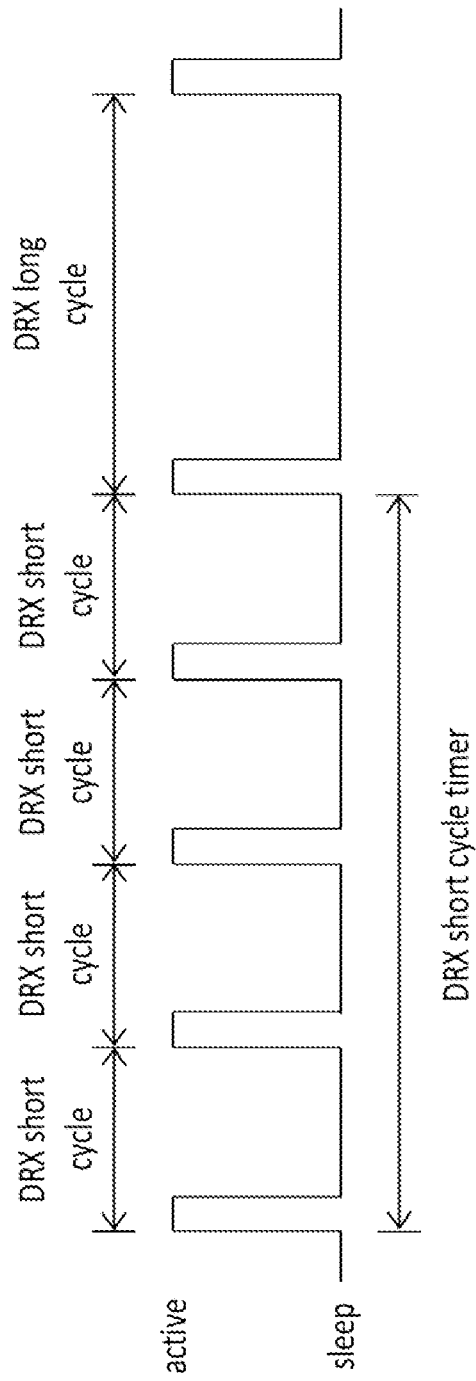

Another parameter in IE 'DRX-Config' are DRX short cycle as 'drx-ShortCycle', DRX long cycle as 'drx-LongCycleStartOffset' and DRX short cycle timer as 'drx-ShortCycleTimer', as shown in FIG. 10. Value of 'drx-ShortCycle' is specified in ms, such as ms1 corresponds to 1 ms, ms2 corresponds to 2 ms, and so on. The value of 'drx-ShortCycle' can be set as one of {ms2, ms3, ms4, ms5, ms6, ms7, ms8, ms10, ms14, ms16, ms20, ms30, ms32, ms35, ms40, ms64, ms80, ms128, ms160, ms256, ms320, ms512, ms640}.

DRX long cycle of 'drx-LongCycleStartOffset' is specified in ms and DRX start offset in multiples of 1 ms. If DRX short cycle is configured, the value of DRX long cycle shall be a multiple of the DRX short cycle value. The value of DRX long cycle in 'drx-LongCycleStartOffset' can be set as one of {ms10, ms20, ms32, ms40, ms60, ms64, ms70, ms80, ms128, ms160, ms256, ms320, ms512, ms640, ms1024, ms1280, ms2048, ms2560, ms5120, ms10240}.

Value of 'drx-ShortCycleTimer' is specified in multiples of DRX short cycle, such as value of 1 corresponds to 1*DRX short cycle, a value of 2 corresponds to 2*DRX short cycle and so on. The value of 'drx-ShortCycleTimer' can be set as one of {1 . . . 16}.

Longer DRX short cycle, longer DRX long cycle, or smaller DRX short cycle timer is beneficial for power saving. Therefore, in some implementations for power saving mode, the value for DRX short cycle is greater than T3 ms wherein T3 is equal to 8, 10, 14 or 16, the value for DRX long cycle is greater than T4 ms wherein T4 is equal to 32, 64, 128 or 512, or the value for DRX short cycle timer is less than T5 wherein T5 is equal to 4 or 8.

Enhanced BWP Processing for Power Saving

The enhanced BWP processing for power saving suggest sparser RS configuration for channel tracking, low power BWP and dormant BWP. A UE in RRC (radio recourse control) connected mode is expected to receive the higher layer UE specific configuration of a 'NZP-CSI-RS-ResourceSet' (non-zero power channel state information reference signal) configured with higher layer parameter 'trs-Info'. For a frequency range 1, the UE is configured with one or more NZP CSI-RS set(s), where a 'NZP-CSI-RS-ResourceSet' includes four periodic NZP CSI-RS resources in two consecutive slots with two periodic NZP CSI-RS resources in each slot. For a frequency range 2 the UE may be configured with one or more NZP CSI-RS set(s), where a 'NZP-CSI-RS-ResourceSet' includes two periodic CSI-RS resources in one slot or with a 'NZP-CSI-RS-ResourceSet' of four periodic NZP CSI-RS resources in two consecutive slots with two periodic NZP CSI-RS resources in each slot. The 'CSI-ResourcePeriodicityAndOffset' in 'NZP-CSI-RS-ResourceSet' can be set as one of {slots4, slots5, slots8, slots10, slots16, slots20, slots32, slots40, slots64, slots80, slots160, slots320, slots640}. Value of 'CSI-ResourcePeriodicityAndOffset' is specified in a corresponding slot. The CSI-RS (channel state information reference signal) can be used for channel tracking. Longer periodicity for reference signal is beneficial for UE power saving. An example for power saving mode is that the value of periodicity in 'CSI-ResourcePeriodicityAndOffset' is greater than T6 slots, wherein T6 is equal to 8, 16, 64, or 320.

It would be also effective for power saving if it is able to put the BWP into power saving state and bring it back quickly. Such BWP can be called 'dormant BWP' where no uplink or downlink grant is allowed (the power consumption for PDCCH monitoring can be saved), but CSI measurement and periodic CSI reporting can continue. The dormant BWP has the smallest bandwidth among the configured BWPs. Thus, an example for power saving mode is that UE is configured into the dormant BWP state.

Low power BWP has the smallest bandwidth among the configured BWPs. In some implementations, CSI measurement and periodic CSI reporting need to be done for low power BWP, and uplink or downlink grant is allowed. Some instance message application (such as WeChat) has small data payload to transmit or to receive. Therefore, the low power BWP can be used with very low power consumption for its very small bandwidth. In an example of low power BWP, the bandwidth is one of 1.25 MHz, 2.5 MHz, or 5 MHz. In another example of low power BWP, its bandwidth is smallest among the configured BWPs. For example, the bandwidths of configured BWPs are {5 MHz, 10 MHz, 15 MHz, 20 MHz}, and the bandwidth of low power BWP is set as 5 MHz. Another example of enhanced BWP processing for power saving, the initial BWP is configured for UE.

Enhanced CA Processing

The enhanced CA processing for power saving suggests quick SCell activation/de-activation, and dormant SCell.

Figure 11:
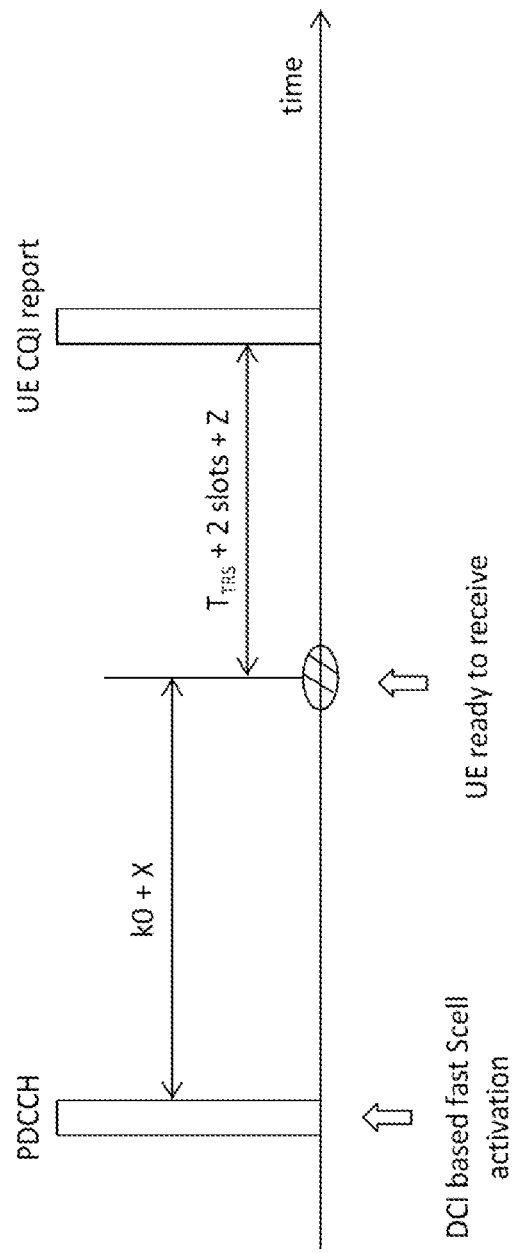
FIG. 11 shows an example of CA processing based on some implementations of the disclosed technology.

The quick SCell (secondary cell) activation/deactivation allow the number of activated SCell to be able to adapt more closely to the actual traffic loads, thereby saving more power. In LTE, SCell activation latency is quite long (24 to 32 ms). FIG. 11 shows an example of a quick SCell activation/deactivation. In NR, the timeline for SCell activation/deactivation can be optimized with aperiodic TRS/CSI and DCI-based signaling as shown in FIG. 11. If A-TRS (aperiodic tracking reference signal) can be used instead of SSB (Synchronization Signal Block) for measurement purpose, the network may be able to align the timing of aperiodic TRS with UE when UE is ready to receive in target cell. Then only $T_{TRS}+2$ slots are needed for the UE to do the measurement and the synchronization. The $T_{TRS}$ can be assumed as 1 or 2 slots to process aperiodic TRS and update loop in a known SCell. Once the UE receives DCI-based fast activation command, only k0+X latency is needed for PDCCH receiving and the UE RF transition (i.e. X latency) to receive new signaling from target SCell. Finally, the UE performs CQI measurements and reporting within Z latency after the UE starts to receive reference signals. An example for power saving mode is that the quick SCell activation/de-activation is performed based on DCI.

Another example for power saving mode suggests configuring the UE with a dormant SCell state. When a SCell is deactivated, the UE does not have to perform any measurement or operations on the SCell. When the SCell is in the dormant state, however, the UE may perform CQI measurements and reporting, albeit at a much sparser periodicity. The transitioning from the dormant state to the active state is still much shorter than a transitioning from the deactivated state to the active state.

Enhanced MIMO Processing

The enhanced MIMO processing for power saving comprises one of following: reduction of UE receiving antenna amount, reduction of UE receiving rank amount, reduction of UE receiving antenna panel amount, reduction of UE spatial domain receive filter amount, reduction of UE wave beam group amount, reduction of UE port group amount, reduction of UE antenna group amount, reduction of UE transmitting antenna amount, reduction of UE transmitting rank amount. In some implementations for power saving of CSI measurements, the UE may be configured to measure the channel state with small number of ranks. The number of MIMO ranks can be one of {1, 2, 4, 8}. An example for power saving mode is that the number of CSI ranks measurements is smaller than T7, wherein T7 is equal to 4, or 8. The term of rank can named as 'layer'.

An example for power saving mode of enhanced MIMO Processing, the UE receiving antenna amount is set as a first value. The maximum UE receiving antenna amount is a second value. Wherein, the first value is less than the second value, such as the first value is equal to 4, and the second value is equal to 8, only 4 receiving antennas are enabled and other receiving antennas are disabled for UE. Since the number of UE receiving antenna decreases and simpler/low power baseband processing can be used for UE, which will reduce the UE power consumption. The maximum UE receiving antenna amount can be obtained based on the UE capability reporting.

An example for power saving mode of enhanced MIMO Processing, the UE receiving rank amount is set as a first value. The maximum UE receiving rank amount is a second value. Wherein, the first value is less than the second value, such as the first value is equal to 2, and the second value is equal to 4 for the maximum UE receiving antenna amount of 4, only 2 receiving ranks (or layers) are enabled for receiving data transmission. Since the number of UE receiving rank decreases and simpler/low power baseband processing can be used for UE, which will reduce the UE power consumption. The first value is equal to half of the second value. The maximum UE receiving rank amount can be obtained based on the UE capability reporting.

An example for power saving mode of enhanced MIMO Processing, the UE receiving antenna panel amount is set as a first value. The maximum UE receiving antenna panel amount is a second value. Wherein, the first value is less than the second value, such as the first value is equal to 2, and the second value is equal to 4, only 2 receiving antenna panels are enabled and other receiving antenna panels are disabled for UE. Since the number of UE receiving antenna panel amount decreases and simpler/low power baseband processing can be used for UE, which will reduce the UE power consumption. The first value is equal to half of the second value. The maximum UE receiving antenna panel amount can be obtained based on the UE capability reporting.

An example for power saving mode of enhanced MIMO Processing, the UE spatial domain receive filter amount is set as a first value. The maximum UE spatial domain receive filter amount is a second value. When the first value is less than the second value, such as the first value is equal to 2, and the second value is equal to 4, only 2 spatial domain receive filters are enabled and other spatial domain receive filters are disabled for UE. Since the number of UE spatial domain receive filter amount decreases and simpler/low power baseband processing can be used for UE, which will reduce the UE power consumption. The first value is equal to half of the second value. The maximum UE spatial domain receive filter amount can be obtained based on the UE capability reporting.

An example for power saving mode of enhanced MIMO Processing, the UE wave beam group amount is set as a first value. The maximum UE wave beam group amount is a second value. When the first value is less than the second value, such as the first value is equal to 2, and the second value is equal to 4, only 2 wave beam groups are enabled and other wave beam groups are disabled for UE. Since the number of UE wave beam group amount decreases and simpler/low power baseband processing can be used for UE, which will reduce the UE power consumption. The first value is equal to half of the second value. The maximum UE wave beam group amount can be obtained based on the UE capability reporting.

An example for power saving mode of enhanced MIMO Processing, the_UE port group amount is set as a first value. The maximum UE port group amount is a second value. When the first value is less than the second value, such as the first value is equal to 2, and the second value is equal to 4, only 2 port groups are enabled and other port groups are disabled for UE. Since the number of UE port group amount decreases and simpler/low power baseband processing can be used for UE, which will reduce the UE power consumption. The first value is equal to half of the second value. The maximum UE port group amount can be obtained based on the UE capability reporting.

An example for power saving mode of enhanced MIMO Processing, the UE antenna group amount is set as a first value. The maximum UE antenna group amount is a second value. When the first value is less than the second value, such as the first value is equal to 2, and the second value is equal to 4, only 2 antenna groups are enabled and other antenna groups are disabled for UE. Since the number of UE antenna group amount decreases and simpler/low power baseband processing can be used for UE, which will reduce the UE power consumption. The first value is equal to half of the second value. The maximum UE antenna group amount can be obtained based on the UE capability reporting.

An example for power saving mode of enhanced MIMO Processing, the UE transmitting antenna amount is set as a first value. The maximum UE transmitting antenna amount is a second value. When the first value is less than the second value, such as the first value is equal to 2, and the second value is equal to 4, only 2 transmitting antennas are enabled and other transmitting antennas are disabled for UE. Since the number of UE transmitting antenna amount decreases and simpler/low power baseband processing can be used for UE, which will reduce the UE power consumption. The first value is equal to half of the second value. The maximum UE transmitting antenna amount can be obtained based on the UE capability reporting.

An example for power saving mode of enhanced MIMO Processing, the UE transmitting rank amount is set as a first value. The maximum UE transmitting rank amount is a second value. When the first value is less than the second value, such as the first value is equal to 2, and the second value is equal to 4, only 2 transmitting ranks (layers) are enabled for UE. Since the number of UE transmitting rank amount decreases and simpler/low power baseband processing can be used for UE, which will reduce the UE power consumption. The first value is equal to half of the second value. The maximum UE transmitting rank amount can be obtained based on the UE capability reporting.

Enhanced PDCCH Monitoring

The enhanced PDCCH monitoring for power saving comprises at least one of following: increase PDCCH monitoring slot periodicity, reduction of PDCCH monitoring slot duration.

An example of enhanced PDCCH monitoring for power saving is described as following. Increase of PDCCH monitoring slot periodicity and reduction of PDCCH monitoring slot duration can be used to reduce the timing ratio of PDCCH monitoring occasion. The parameter of PDCCH monitoring slot periodicity in search space is denoted by 'monitoringSlotPeriodicityAndOffset', and it defines slots for PDCCH monitoring slot periodicity and offset. 'monitoringSlotPeriodicityAndOffset' is equal to one of {s11, s12, s14, s15, s18, s110, s116, s120, s140, s180, s1160, s1320, s1640, s11280, s12560}. The parameter of PDCCH monitoring slot duration in search space is denoted by 'duration'. It defines the number of consecutive slots that a search space lasts in every occasion, i.e., upon every period as given in the periodicityAndOffset. 'duration' can be configured for an integer greater than 1 and less than PDCCH monitoring slot periodicity minus 1. One example of enhanced PDCCH monitoring for power saving, the PDCCH monitoring slot periodicity is greater than a first value and the PDCCH monitoring slot duration is less than a second value. The first value is equal to one of 40, 160, 320 or 640. The second value is equal to one of 2, 4, 8, 16, or 32.

Figure 12:
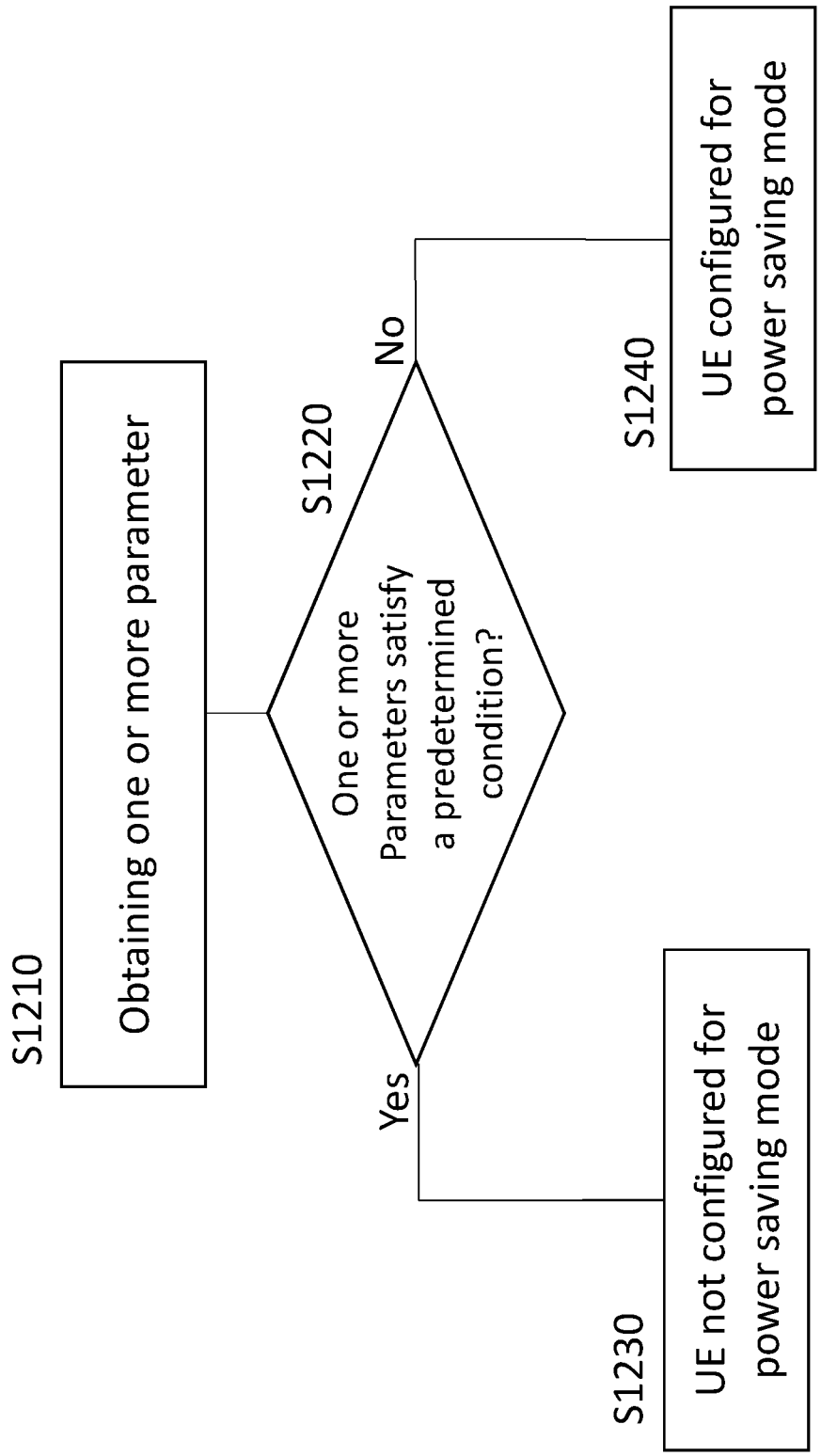
FIG. 12 shows another example of a power saving scheme based on some implementations of the disclosed technology.

Various implementations of the disclosed technology will be further discussed with reference to FIG. 12. FIG. 12 shows an example of a power saving scheme based on the disclosed technology. The method suggested in FIG. 12 may be applied to a base station. At 1210, one or more parameters are obtained. At 1220, a determination is made whether the one or more parameters satisfy a predetermined condition. The condition may be varied depending on the parameters obtained. For example, the condition may include whether the parameters obtained at 1210 match information provided by MCS (Modulation Coding Scheme) field. Based on the determination, the UE is configured for the power saving mode (step 1240) or not configured for the power saving mode (step 1230).

As already discussed above, the power saving of the UE can be implemented by at least one of the following: enhanced time domain processing for power saving, enhanced DRX processing for power saving, enhanced BWP processing for power saving, enhanced CA processing for power saving, enhanced MIMO processing for power saving, or enhanced PDCCH monitoring for power saving. The enhanced time domain processing for power saving comprises one of following: cross slot scheduling for PDSCH, multi-slot scheduling, slot aggregation scheduling. The enhanced DRX processing for power saving comprises one of following: reduction of DRX on duration timer, reduction of DRX inactivity timer, reduction of DRX re-transmission timer, increase of DRX short cycle, increase of DRX short cycle, reduction of DRX short cycle timer. The enhanced BWP processing for power saving comprises one of following: RS configuration for channel tracking, and CSI measurements. The enhanced CA processing for power saving comprises one of following: reduction of CSI/RRM measurement, and dormant SCell. The enhanced MIMO processing for power saving comprises one of following: reduction of UE receiving antenna amount, reduction of UE receiving rank amount, reduction of UE receiving antenna panel amount, reduction of UE spatial domain receive filter amount, reduction of UE wave beam group amount, reduction of UE port group amount, reduction of UE antenna group amount, reduction of UE transmitting antenna amount, reduction of UE transmitting rank amount. The enhanced PDCCH monitoring for power saving comprises: reduction of PDCCH monitoring amount.

The specific parameters obtained at 1210 can be varied in many situations. Based on the specific parameters obtained at 1210, the condition of the determination at 1220 can be also varied. Thus, the disclosed technology can provide various implementations to achieve the power saving of the UE by including different specific parameters obtained at 1210 and/or different conditions for the determination at 1220.

Implementation 1

In this implementation, the parameter obtained at 1210 is a scrambling method configured for PDCCH. At 1220, the scrambling method configured for PDCCH is compared with MCS-C-RNTI. If the scrambling method configured for PDCCH matches information in MCS-C-RNTI, the UE proceeds to 1230 and the power saving mode is not configured for the UE. If the scrambling method configured for PDCCH does not match information in MCS-C-RNTI, the UE proceeds to 1240 and the power saving mode is configured for the UE.

Implementation 2

In this implementation, the parameter obtained at 1210 may include a scrambling method configured for PDCCH and an actual scrambling method of PDCCH. At 1220, both of the scrambling method configured for PDCCH and the actual scrambling method of PDCCH are compared with the information in the MCS-C-RNTI. The determination made at 1220 may include i) whether the UE is configured with MCS-C-RNTI (scrambling method configured for PDCCH is MCS-C-RNTI), and ii) whether the PDSCH is scheduled by a PDCCH with CRC (Cyclic redundancy check) scrambled by MCS-C-RNTI (actual scrambling method of PDCCH is also MCS-C-RNTI). If it is determined 'Yes' at step 1220, i.e., satisfying both i) and ii), the UE proceeds to 1230 and the UE is not configured for power saving mode. If it is determined 'No' at step 1220, i.e., not satisfying at least one of i) and ii), the UE proceeds to 1240 and the UE is configured for power saving mode.

Implementation 3

In this implementation, the parameter obtained at 1210 may include a scrambling method configured for PDCCH, an actual scrambling method of PDCCH, and PDSCH configuration. In some implementations, PDSCH configuration comprises MCS table. The determination made at 1220 may include i) whether the UE is not configured with MCS-C-RNTI (scrambling method configured for PDCCH is not MCS-C-RNTI), ii) whether the higher layer parameter 'mcs-Table' given by 'PDSCH-Config' is set to 'qam64LowSE' (the MCS table in PDSCH configuration is 'qam64LowSE'), and iii) whether the PDSCH is scheduled by a PDCCH in a UE specific search space with CRC scrambled by C-RNTI (actual scrambling method of PDCCH is C-RNTI). If it is determined 'Yes' at step 1220, i.e., satisfying i) to iii), the UE proceeds to 1230 and the UE is not configured for power saving mode. If it is determined 'No' at step 1220, i.e., not satisfying at least one of i) to iii), the UE proceeds to 1240 and the UE is configured for power saving mode.

Implementation 4

In this implementation, the parameter obtained at 1210 may include a semi persistent scheduling configuration, and an actual scrambling method of PDCCH. In some implementations, the semi persistent scheduling configuration comprises MCS table. The determination made at 1220 may include i) whether the UE is configured with the higher layer parameter 'mcs-Table' given by 'SPS-config' (semi persistent scheduling configuration) set to 'qam64LowSE' (MCS table in semi persistent scheduling configuration is 'qam64LowSE'), ii) whether the PDSCH is scheduled by a PDCCH with CRC scrambled by CS-RNTI (actual scrambling method of PDCCH is CS-RNTI), and iii) if the PDSCH is scheduled without corresponding PDCCH transmission using 'SPS-config'. If satisfying i) and ii) or satisfying i) and iii), the UE proceeds to 1230 and the UE is not configured for power saving mode. Otherwise, the UE proceeds to 1240 and the UE is configured for power saving mode.

Implementation 5

In this implementation, the parameter obtained at 1210 may include a scrambling method configured for PDCCH, an actual scrambling method of PDCCH, PUSCH configuration, uplink OFDM waveform, and search space. In some implementations, PUSCH configuration comprises MCS table and search space comprises search space type. The determination made at 1220 may include i) whether transform precoding is disabled for this PUSCH transmission (uplink OFDM waveform is not transform precoding OFDM), ii) whether the UE is not configured with MCS-C-RNTI (scrambling method configured for PDCCH is not MCS-C-RNTI), 'mcs-Table' in 'PUSCH-Config' is set to 'qam64LowSE' (the MCS table in PUSCH configuration is 'qam64LowSE'), iii) whether the PUSCH is scheduled with C-RNTI or SP-CSI-RNTI (actual scrambling method of PDCCH is C-RNTI or SP-CSI-RNTI), and iv) the PUSCH is assigned by a PDCCH in a UE specific search space (the search space type is UE specific search space). If satisfying i) to iv), the UE proceeds to 1230 and the UE is not configured for power saving mode. Otherwise, the UE proceeds to 1240 and the UE is configured for power saving mode.

Implementation 6

In this implementation, the parameter obtained at 1210 may include a scrambling method configured for PDCCH, an actual scrambling method of PDCCH, and uplink OFDM waveform. The determination made at 1220 may include i) whether transform precoding is disabled for this PUSCH transmission (uplink OFDM waveform is not transform precoding OFDM), ii) whether the UE is configured with MCS-C-RNTI (scrambling method configured for PDCCH is MCS-C-RNTI), and iii) whether the PUSCH is scheduled with MCS-C-RNTI (actual scrambling method of PDCCH is MCS-C-RNTI). If satisfying i) to iii), the UE proceeds to 1230 and the UE is not configured for power saving mode. Otherwise, the UE proceeds to 1240 and the UE is configured for power saving mode.

Implementation 7

In this implementation, the parameter obtained at 1210 may include grant configuration, uplink OFDM waveform, and an actual scrambling method of PDCCH. In some implementations, grant configuration comprises MCS table. The determination made at 1220 may include i) whether transform precoding is disabled for this PUSCH transmission (uplink OFDM waveform is not transform precoding OFDM), ii) whether 'mcs-Table' in 'ConfiguredGrantConfig' is set to 'qam64LowSE' (MCS table in grant configuration is 'qam64LowSE'), and iii) whether PUSCH is scheduled with CS-RNTI (actual scrambling method of PDCCH is CS-RNTI). If satisfying i) to iii), the UE proceeds to 1230 and the UE is not configured for power saving mode. Otherwise, the UE proceeds to 1240 and the UE is configured for power saving mode.

Implementation 8

In this implementation, the parameter obtained at 1210 may include a scrambling method configured for PDCCH, an actual scrambling method of PDCCH, PUSCH configuration, uplink OFDM waveform, and search space. In some implementations, search space comprises search space type. The determination made at 1220 may include i) whether transform precoding is enabled for this PUSCH transmission (uplink OFDM waveform is transform precoding OFDM), ii) whether the UE is not configured with MCS-C-RNTI (scrambling method configured for PDCCH is not MCS-C-RNTI), iii) whether 'mcs-TableTransformPrecoder' in 'PUSCH-Config' is set to 'qam64LowSE' (MCS table in PUSCH configuration is 'qam64LowSE'), iv) whether the PUSCH is scheduled with C-RNTI or SP-CSI-RNTI (actual scrambling method of PDCCH is C-RNTI or SP-CSI-RNTI), and v) whether the PUSCH is assigned by a PDCCH in a UE specific search space (the search space type is UE specific search space). If satisfying i) to v), the UE proceeds to 1230 and the UE is not configured for power saving mode. Otherwise, the UE proceeds to 1240 and the UE is configured for power saving mode.

Implementation 9

In this implementation, the parameter obtained at 1210 may include uplink OFDM waveform, scrambling method configured for PDCCH, and actual scrambling method of PDCCH. The determination made at 1220 may include i) whether transform precoding is enabled for this PUSCH transmission (uplink OFDM waveform is transform precoding OFDM), ii) whether the UE is configured with MCS-C-RNTI (scrambling method configured for PDCCH is MCS-C-RNTI), and iii) whether the PUSCH is scheduled with MCS-C-RNTI (actual scrambling method of PDCCH is MCS-C-RNT). If satisfying i) to iii), the UE proceeds to 1230 and the UE is not configured for power saving mode. Otherwise, the UE proceeds to 1240 and the UE is configured for power saving mode.

Implementation 10

In this implementation, the parameter obtained at 1210 may include uplink OFDM waveform, grant configuration, and actual scrambling method of PDCCH. In some implementations, grant configuration comprises MCS table. The determination made at 1220 may include i) whether transform precoding is enabled for this PUSCH transmission (uplink OFDM waveform is transform precoding OFDM), ii) whether 'mcs-TableTransformPrecoder' in 'ConfiguredGrantConfig' is set to 'qam64LowSE' (MCS table in grant configuration is 'qam64LowSE'), and iii) whether PUSCH is scheduled with CS-RNTI (actual scrambling method of PDCCH is CS-RNTI). If satisfying i) to iii), the UE proceeds to 1230 and the UE is not configured for power saving mode. Otherwise, the UE proceeds to 1240 and the UE is configured for power saving mode.

Implementation 11

In this implementation, the parameter obtained at 1210 may include CSI report configuration. In some implementations, CSI report configuration comprises CQI table. The determination made at 1220 may include whether the higher layer parameter 'cqi-Table' in 'CSI-ReportConfig' configures 'table3' (CQI table in CSI report configuration is 'table3'). If it is determined that the higher layer parameter 'cqi-Table' in 'CSI-ReportConfig' configures 'table3', the UE proceeds to 1230 and the UE is not configured for power saving mode. Otherwise, the UE proceeds to 1240 and the UE is configured for power saving mode.

Implementation 12

In this implementation, the parameter obtained at 1210 may include uplink OFDM waveform. The determination made at 1220 may include whether transform precoding is enabled for this PUSCH transmission (uplink OFDM waveform is transform precoding OFDM). If it is determined that transform precoding is enabled for this PUSCH transmission, the UE proceeds to 1230 and the UE is not configured for power saving mode. Otherwise, the UE proceeds to 1240 and the UE is configured for power saving mode.

Implementation 13

In this implementation, the parameter obtained at 1210 may include PUSCH configuration. In some implementations, the PUSCH configuration comprises following parameter: start symbol & length of PUSCH. The determination made at 1220 may include i) whether the allocation length of OFDM symbols (L) indicated by start symbol & length of PUSCH is less than a first threshold value, ii) whether the start symbols index (S) indicated by start symbol & length of PUSCH is less than a second threshold value. If satisfying i), or satisfying ii), or satisfying i) and ii), the UE proceeds to 1230 and the UE is not configured for power saving mode. Otherwise, the UE proceeds to 1240 and the UE is configured for power saving mode. The first threshold value is one of 3, 4, 5, 6, 7, or 8. The second threshold value is one of 1, 2, 3, 4, 5, 6, 7, or 8.

Implementation 14

In this implementation, the parameter obtained at 1210 may include PDSCH configuration. In some implementations, the PDSCH configuration comprises following parameter: start symbol & length of PDSCH, and PDSCH aggregation factor. The determination made at 1220 may include i) whether the allocation length of OFDM symbols (L) indicated in start symbol & length of PDSCH is less than a first threshold value, ii) whether the start symbols index (S) indicated by start symbol & length of PDSCH is less than a second threshold value, iii) whether the PDSCH aggregation factor is less than a third threshold value. If satisfying i), or satisfying ii), or satisfying iii), or satisfying i) and ii), or satisfying i) and iii), or satisfying ii) and iii), the UE proceeds to 1230 and the UE is not configured for power saving mode. Otherwise, the UE proceeds to 1240 and the UE is configured for power saving mode. The first threshold value is one of 3, 4, 5, 6, 7, or 8. The second threshold value is one of 1, 2, 3, 4, 5, 6, 7, or 8. The third threshold value is one of 2 or 4.

Implementation 15

In this implementation, the parameter obtained at 1210 may include DCI format. In some implementations, the DCI format comprises at least one of following parameters: DCI format 0_0, DCI format 0_1, DCI format 1_0, DCI format 1_1, DCI format 2_0, DCI format 2_1, DCI format 2_2, DCI format 2_3. The determination made at 1220 may include i) whether the DCI format is DCI format 0_0, and ii) whether the DCI format is DCI format 1_0. If satisfying i), or satisfying ii), the UE proceeds to 1240 and the UE is configured for power saving mode. Otherwise, the UE proceeds to 1230 and the UE is not configured for power saving mode.

Implementation 16

In this implementation, the parameter obtained at 1210 may include search space. In some implementations, the search space comprises at least one of following parameters: search space type, PDCCH monitoring slot periodicity, PDCCH monitoring slot duration. The determination made at 1220 may include i) whether the search space type is common search space, ii) whether the PDCCH monitoring slot periodicity is less than a first threshold value, and iii) whether the PDCCH monitoring slot duration is larger than a second threshold value. If satisfying i), or satisfying ii), or satisfying iii), or satisfying ii) and iii), the UE proceeds to 1230 and the UE is not configured for power saving mode. Otherwise, the UE proceeds to 1240 and the UE is configured for power saving mode. The first threshold value is one of 40, 160, 320 or 640. The second threshold value is one of 2, 4, 8, 16, 32, or 64.

Implementation 17

In this implementation, the parameter obtained at 1210 may include aggregation level. In some implementations, the aggregation level comprises at least one of following parameters: 1, 2, 4, 8, 16. The determination made at 1220 may include whether the aggregation level is greater than a threshold value. If the aggregation level is greater than the threshold value, the UE proceeds to 1230 and the UE is not configured for power saving mode. Otherwise, the UE proceeds to 1240 and the UE is configured for power saving mode. The threshold value is 2 or 4.

Implementation 18

In this implementation, the parameter obtained at 1210 may include subcarrier spacing. In some implementations, the subcarrier spacing comprises at least one of following parameters: 15 kHz, 30 kHz, 60 kHz, 120 kHz, 240 kHz, 480 kHz. The different subcarrier spacings can be denoted by a parameter of $\mu$, wherein $\mu$ equals to 0 for 15 kHz, $\mu$ equals to 1 for 30 kHz, $\mu$ equals to 2 for 60 kHz, $\mu$ equals to 3 for 120 kHz, $\mu$ equals to 4 for 240 kHz, $\mu$ equals to 5 for 480 kHz. The determination made at 1220 may include whether the subcarrier spacing is larger than a first threshold value (or $\mu$ is larger than a second threshold value). If the subcarrier spacing is greater than the first threshold value (or $\mu$ is larger than a second threshold value), the UE proceeds to 1230 and the UE is not configured for power saving mode. Otherwise, the UE proceeds to 1240 and the UE is configured for power saving mode. The threshold value is 15 kHz, 30 kHz, or 60 kHz (second threshold value is 0, 1, or 2).

Implementation 19

In this implementation, the parameter obtained at 1210 may include frequency range. In some implementations, the frequency range comprises at least one of following parameters: FR1 (frequency range 1 for carrier frequency smaller than 6 GHz or sub-6 GHz) and FR2 (frequency range 2 for carrier frequency larger than 6 GHz). Sub 6 Ghz range is called FR1 and millimeter wave range is called FR2, and Table 5 shows a specific definition of frequency ranges. The determination made at 1220 may include whether the frequency range is FR2. If the frequency range is FR2, the UE proceeds to 1230 and the UE is not configured for power saving mode. Otherwise, the UE proceeds to 1240 and the UE is configured for power saving mode.

TABLE 5

Definition of frequency ranges

| Frequency range designation | Corresponding frequency range |
| --- | --- |
| FR1 | 450 MHz-6000 MHz |
| FR2 | 24250 MHz-52600 MHz |

Implementation 20

In this implementation, the parameter obtained at 1210 may include uplink OFDM waveform. In some implementations, the uplink OFDM waveform comprises at least one of following parameters: cyclic prefix OFDM, transform precoding OFDM. The determination made at 1220 may include whether the uplink OFDM waveform is transform precoding OFDM. If the uplink OFDM waveform is transform precoding OFDM, the UE proceeds to 1240 and the UE is configured for power saving mode. Otherwise, the UE proceeds to 1230 and the UE is not configured for power saving mode.

Implementation 21

In this implementation, the parameter obtained at 1210 may include DCI format. In some implementations, the DCI format comprises at least one of following parameters: DCI format 0_0, DCI format 0_1, DCI format 1_0, DCI format 1_1, DCI format 2_0, DCI format 2_1, DCI format 2_2, DCI format 2_3. The determination made at 1220 may include whether the DCI format is DCI format 0_0 or DCI format 1_0. If the DCI format is DCI format 0_0 or DCI format 1_0, the UE proceeds to 1240 and the UE is configured for power saving mode. Otherwise, the UE proceeds to 1230 and the UE is not configured for power saving mode.

Implementation 22

In this implementation, the parameter obtained at 1210 may include control resource set. In some implementations, the control resource set comprises at least one of following parameters: frequency domain resource, duration, precoder granularity. The determination made at 1220 may include i) whether the total number of '1' in frequency domain resource is less than a first threshold value, ii) whether the duration is less than a second threshold value, and iii) whether the precoder granularity is set as 'sameAsREG-bundle'. If satisfying i), or satisfying ii), or satisfying iii), or satisfying i) and iii), or satisfying ii) and iii), the UE proceeds to 1240 and the UE is configured for power saving mode. Otherwise, the UE proceeds to 1230 and the UE is not configured for power saving mode. The first threshold value is one of 2, 4, 8, 12, or 16. The second threshold value is one of 2, 3, or 4. Frequency domain resources for the CORESET (control resource set). Each bit corresponds a group of 6 RBs, with grouping starting from the first RB group in the BWP. The first (left-most/most significant) bit corresponds to the first RB group in the BWP, and so on. A bit that is set to 1 indicates that this RB group belongs to the frequency domain resource of this CORESET. Bits corresponding to a group of RBs not fully contained in the bandwidth part within which the CORESET is configured are set to zero. And, the duration is defined as Contiguous time duration of the CORESET in number of symbols.

Implementation 23

In this implementation, the parameter obtained at 1210 may include PDCCH candidates. In some implementations, the PDCCH candidates comprises at least one of following parameters: number of candidates for aggregation level 1, number of candidates for aggregation level 2, number of candidates for aggregation level 4, number of candidates for aggregation level 8, number of candidates for aggregation level 16. The determination made at 1220 may include whether the number of candidates for aggregation level 1 (or 2, or 4, or 8, or 16) is less than a threshold value. If the number of candidates for aggregation level 1 (or 2, or 4, or 8, or 16) is less than a threshold value, the UE proceeds to 1240 and the UE is configured for power saving mode. Otherwise, the UE proceeds to 1230 and the UE is not configured for power saving mode. The threshold value is 16, 24, or 32.

Implementation 24

In this implementation, the parameter obtained at 1210 may include CSI configuration. It configures a semi-persistent or aperiodic report sent on PUSCH triggered by DCI received on the cell. In some implementations, the CSI configuration comprises at least one of following parameters: report configuration type, CSI reporting band, and CSI report periodicity. The determination made at 1220 may include i) whether the report configuration type is set as 'aperiodic', ii) whether the CSI report periodicity is larger than a first threshold value, and iii) whether the number of CSI reporting band is less than a second value. If satisfying i), or satisfying ii), or satisfying iii), or satisfying i) and iii), or satisfying ii) and iii), the UE proceeds to 1240 and the UE is configured for power saving mode. Otherwise, the UE proceeds to 1230 and the UE is not configured for power saving mode. The first threshold value is one of 20, 40, or 80. The second threshold value is one of 6, 8, or 10. CSI reporting band Indicates a contiguous or non-contiguous subset of subbands in the bandwidth part which CSI shall be reported for. Each bit in the bit-string represents one subband. The right-most bit in the bit string represents the lowest subband in the BWP. The choice determines the number of subbands (subbands3 for 3 subbands, subbands4 for 4 subbands, and so on). CSI report periodicity is specified in slot.

Additional features and embodiments the above-described methods/techniques discussed above are described below using a clause-based description format.

1. A wireless communication method including: obtaining, by a network device, one or more parameters of a user device; determining, by the network device, whether the one or more parameters satisfy a predetermined condition; and configuring the user device in a power saving mode based on a result of the determining.

2. The wireless communication method of clause 1, wherein the one or more parameters include at least one of a scrambling method, an actual scrambling method, control information format, control resource set, search space, PDCCH candidates, aggregation level, subcarrier spacing, frequency range, CSI (Channel State Information) configuration, PDSCH (Physical Downlink Shared Channel) configuration, PUSCH (Physical Uplink Shared Channel) configuration, semi persistent scheduling configuration, or OFDM (Orthogonal Frequency Division Multiplexing) waveform.

3. The wireless communication method of clause 1, wherein the configuring the user device in the power saving mode includes controlling at least one of a time domain processing, a DRX (Discontinuous Reception) mode processing, a BWP (Bandwidth Part) processing, a CA (Carrier Aggregation) processing, a MIMO (Multiple Input Multiple Output) processing, or a control channel monitoring.

4. The wireless communication method of clause 3, wherein the time domain processing includes allocating a control channel at a first timing and an information channel at a second timing occurring later than the first timing, a slot offset between the first timing and the second timing being greater than 0.

5. The wireless communication method of clause 4, wherein the control channel includes PDCCH and the information channel includes at least one of PDSCH, PUSCH, or HARQ-ACK (Hybrid Automatic Repeat Request Acknowledgement).

6. The wireless communication method of clause 3, wherein the DRX mode processing includes setting a DRX related parameter to have a value less than a threshold, the DRX related parameter including at least one of a duration timer, an inactivity timer, a retransmission timer, or a DRX short cycle timer.

7. The wireless communication method of clause 3, wherein the DRX mode processing includes setting a DRX related parameter to have a value greater than a threshold, the DRX related parameter including at least one of a DRX short cycle or a DRX long cycle.

8. The wireless communication method of clause 3, wherein the BWP processing includes at least one of sparser RS configuration, low power BWP, or dormant BWP.

9. The wireless communication method of clause 3, wherein the CA processing includes optimizing a timeline for a cell activation or deactivation with an aperiodic signal.

10. The wireless communication method of clause 3, wherein the CA processing includes configuring the user device in a dormant state during which the user device is without for uplink or downlink grant.

11. The wireless communication method of clause 3, wherein the MIMO processing includes reducing at least one of an UE receiving antenna amount, an UE receiving rank amount, an UE receiving antenna panel amount, an UE spatial domain receiving filter amount, an UE wave beam group amount, an UE port group amount, an UE antenna group amount, an UE transmitting antenna amount, or an UE transmitting ranking amount.

12. The wireless communication method of clause 3, wherein the control channel monitoring includes at least one of an increase of PDCCH monitoring slot periodicity or a reduction of PDCCH monitoring slot duration.

13. The wireless communication method of clause 2, wherein the scrambling method includes at least one of C-RNTI (Cell Radio Network Temporary Identifier), MCS-C-RNTI (Modulation and coding scheme C-RNTI), TC-RNTI (Temporary C-RNTI), SP-CSI-RNTI (Semi-Persistent Channel State Information RNTI), CS-RNTI (Configured Scheduling RNTI), or RA-RNTI (Random Acess RNTI).

14. The wireless communication method of clause 2, wherein the actual scrambling method includes at least one of C-RNTI, MCS-C-RNTI, TC-RNTI, SP-CSI-RNTI, CS-RNTI, or RA-RNTI.

15. The wireless communication method of clause 2, wherein the search space includes at least one of search space type, PDCCH monitoring slot periodicity, or PDCCH monitoring slot duration.

16. The wireless communication method of clause 2, wherein the PDSCH configuration includes at least one of MCS table of PDSCH or start symbol and length of PDSCH.

17. The wireless communication method of clause 2, wherein the PUSCH configuration includes at least one of MCS table of PUSCH or start symbol and length of PUSCH.

19. The wireless communication method of clause 3, wherein the semi persistent scheduling configuration includes at least one of MCS table or periodicity.

20. The wireless communication method of claim 3, wherein the uplink OFDM waveform includes at least one of cyclic prefix OFDM or transform precoding OFDM.

A wireless communications apparatus comprising a processor and a memory, wherein the processor is configured to read code from the memory and implement a method recited in any of clauses 1 to 20.

19. A computer program product comprising a computer-readable program medium code stored thereupon, the code, when executed by a processor, causing the processor to implement a method recited in any of clauses 1 to 20.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
configuring one or more parameters of a user device that include a control information including a first downlink control information, DCI, format scheduling a physical uplink shared channel, PUSCH, in a cell or a second DCI format scheduling a physical downlink shared channel, PDSCH, in the cell, the first DCI format being DCI format 0_0 or DCI format 0_1 and the second DCI format being DCI format 1_0 or DCI format 1_1;

configuring, by a network device, the user device to operate in a cross slot scheduling mode by transmitting configuration information including the one or more parameters to the user device,
wherein, in the cross slot scheduling mode, a slot offset between a first slot for a transmission of a control channel carrying the control information and a second slot for a transmission of the PUSCH or the PDSCH is greater than zero, the second slot being later than the first slot;
wherein in response to receiving the control information including the second DCI format scheduling the PDSCH, the user device is scheduled to receive the PDSCH with the slot offset between the first slot and the second slot carrying the PDSCH being greater than one slot, and in response to receiving the control information including the first DCI format scheduling the PUSCH, the user device is scheduled to receive the PUSCH with the slot offset between the first slot and the second slot carrying the PUSCH being one of {7, 8, 9, 10, 12, 15},
wherein the slot offset has a value (N) that identifies the second slot in a slot N that is a $N^{th}$ slot from the first slot in a slot 0 among a set of slots, {slot 0, . . . slot N}, N being a natural number, the set of slots including N slots sequentially arranged without any intervening slot and each slot configured for data transmissions between the user device and the network device.

2. The wireless communication method of claim 1, wherein the one or more parameters of the user device further include at least one of PDSCH configuration, or PUSCH configuration.

3. The wireless communication method of claim 1, wherein the control channel includes a physical downlink control channel (PDCCH).

4. A wireless communication method, comprising:
receiving, by a user device from a network device, configuration information to operate the user device in a cross slot scheduling mode in which a slot offset between a first slot for a transmission of a control channel carrying a control information and a second slot for a transmission of a physical uplink shared channel, PUSCH, or a physical downlink shared channel, PDSCH, is greater than zero, the second slot being later than the first slot;
receiving, by the user device, the transmission of the control channel in the first slot,
wherein the control channel carries allocation information that allocates the second slot,
wherein the configuration information includes one or more parameters of the user device that include the control information including a first downlink control information, DCI, format scheduling the PUSCH in a cell or a second DCI format scheduling the PDSCH, in the cell, the first DCI format being DCI format 0_0 or DCI format 0_1 and the second DCI format being DCI format 1_0 or DCI format 1_1, and
wherein in response to receiving the control information including the second DCI format scheduling the PDSCH, the user device is scheduled to receive the PDSCH with the slot offset between the first slot and the second slot carrying the PDSCH being greater than one slot, and in response to receiving the control information including the first DCI format scheduling the PUSCH, the user device is scheduled to receive the PUSCH with the slot offset between the first slot and the second slot being one of {7, 8, 9, 10, 12, 15},
wherein the slot offset has a value (N) that identifies the second slot in a slot N that is a $N^{th}$ slot from the first slot in a slot 0 among a set of slots, {slot 0, . . . slot N}, N being a natural number, the set of slots including N slots sequentially arranged without any intervening slot and each slot configured for data transmissions between the user device and the network device.

5. The wireless communication method of claim 4, wherein the one or more parameters of the user device further include at least one of PDSCH configuration, or PUSCH configuration.

6. The wireless communication method of claim 4, wherein the control channel includes a physical downlink control channel (PDCCH).

7. The wireless communication method of claim 4, further comprising configuring the user device to operate in the cross slot scheduling mode based on the configuration information.

8. A wireless communication apparatus, comprising a processor configured to implement a method comprising:
configuring one or more parameters of a user device that include a control information including a first downlink control information, DCI, format scheduling a physical uplink shared channel, PUSCH, in a cell or a second DCI format scheduling a physical downlink shared channel, PDSCH, in the cell, the first DCI format being DCI format 0_0 or DCI format 0_1 and the second DCI format being DCI format 1_0 or DCI format 1_1;
configuring the user device to operate in a cross slot scheduling mode by transmitting configuration information including the one or more parameters to the user device,
wherein, in the cross slot scheduling mode, a slot offset between a first slot for a transmission of a control channel carrying the control information and a second slot for a transmission of the PUSCH or the PDSCH is greater than zero, the second slot being later than the first slot;
wherein in response to receiving the control information including the second DCI format scheduling the PDSCH, the user device is scheduled to receive the PDSCH with the slot offset between the first slot and the second slot carrying the PDSCH being greater than one slot, and in response to receiving the control information including the first DCI format scheduling the PUSCH, the user device is scheduled to receive the PUSCH with the slot offset between the first slot and the second slot carrying the PUSCH being one of {7, 8, 9, 10, 12, 15},
wherein the slot offset has a value (N) that identifies the second slot in a slot N that is a $N^{th}$ slot from the first slot in a slot 0 among a set of slots, {slot 0 . . . slot N}, N being a natural number, the set of slots including N slots sequentially arranged without any intervening slot and each slot configured for data transmissions between the user device and a network device.

9. The wireless communication apparatus of claim 8, wherein the one or more parameters of the user device further include at least one of PDSCH configuration, or PUSCH configuration.

10. The wireless communication apparatus of claim 8, wherein the control channel includes a physical downlink control channel (PDCCH).

11. A wireless communication apparatus, comprising a processor configured to implement a method comprising:
receiving configuration information to operate the wireless communication apparatus in a cross slot scheduling mode in which a slot offset between a first slot for a transmission of a control channel carrying a control information and a second slot for a transmission of a physical uplink shared channel, PUSCH, or a physical downlink shared channel, PDSCH, is greater than zero, the second slot being later than the first slot;

receiving the transmission of the control channel in the first slot; and wherein the control channel carries allocation information that allocates the second slot, wherein the configuration information includes one or more parameters of the wireless communication apparatus that include the control information including a first downlink control information, DCI, format scheduling the PUSCH in a cell or a second DCI format scheduling the PDSCH, in the cell, the first DCI format being DCI format 0_0 or DCI format 0_1 and the second DCI format being DCI format 1_0 or DCI format 1_1, and wherein in response to receiving the control information including the second DCI format scheduling the PDSCH, the wireless communication apparatus is scheduled to receive the PDSCH with the slot offset between the first slot and the second slot carrying the PDSCH being greater than one slot, and in response to receiving the control information including the first DCI format scheduling the PUSCH, the wireless communication apparatus is scheduled to receive the PUSCH with the slot offset between the first slot and the second slot being one of {7, 8, 9, 10, 12, 15}, wherein the slot offset has a value (N) that identifies the second slot in a slot N that is a $N^{th}$ slot from the first slot in a slot 0 among a set of slots, {slot 0 . . . slot N}, N being a natural number, the set of slots including N slots sequentially arranged without any intervening slot and each slot configured for data transmissions between a user device and a network device.

12. The wireless communication apparatus of claim 11, wherein the one or more parameters of the wireless communication apparatus further include at least one of PDSCH configuration, or PUSCH configuration.

13. The wireless communication apparatus of claim 11, wherein the control channel includes a physical downlink control channel (PDCCH).

14. The wireless communication apparatus of claim 11, wherein the method further comprises configuring the wireless communication apparatus to operate in the cross slot scheduling mode based on the configuration information.

* * * * *

UNITED STATES PATENT AND TRADEMARK OFFICE
CERTIFICATE OF CORRECTION

| | | |
|---|---|---|
| PATENT NO. | : 12,289,676 B2 | Page 1 of 1 |
| APPLICATION NO. | : 17/245292 | |
| DATED | : April 29, 2025 | |
| INVENTOR(S) | : Liguang Li et al. | |

It is certified that error appears in the above-identified patent and that said Letters Patent is hereby corrected as shown below:

In the Claims

In Column 25, Line 18, delete "receive" and insert --transmit-- therefor
In Column 25, Line 65, delete "receive" and insert --transmit-- therefor
In Column 26, Line 46, delete "receive" and insert --transmit-- therefor
In Column 28, Line 3, delete "receive" and insert --transmit-- therefor Signed and Sealed this
Tenth Day of June, 2025

Coke Morgan Stewart
*Acting Director of the United States Patent and Trademark Office*